United States Patent
Chapman et al.

(10) Patent No.: US 9,722,504 B2
(45) Date of Patent: Aug. 1, 2017

(54) APPARATUS FOR CONVERTING DIRECT CURRENT TO ALTERNATING CURRENT USING MULTIPLE CONVERTERS

(71) Applicant: SunPower Corporation, San Jose, CA (US)

(72) Inventors: Patrick L. Chapman, Austin, TX (US); Brian T. Kuhn, Austin, TX (US); Robert S. Balog, College Station, TX (US); Jonathan W. Kimball, Rolla, MO (US); Philip T. Krein, Champaign, IL (US); Alexander Gray, Champaign, IL (US)

(73) Assignee: SunPower Corporation, San Jose, CA (US)

( * ) Notice: Subject to any disclaimer, the term of this patent is extended or adjusted under 35 U.S.C. 154(b) by 9 days.

(21) Appl. No.: 14/810,022

(22) Filed: Jul. 27, 2015

(65) Prior Publication Data
US 2015/0333617 A1    Nov. 19, 2015

Related U.S. Application Data

(63) Continuation of application No. 13/633,518, filed on Oct. 2, 2012, now Pat. No. 9,093,919, which is a continuation of application No. 12/563,499, filed on Sep. 21, 2009, now Pat. No. 8,279,642.

(60) Provisional application No. 61/230,546, filed on Jul. 31, 2009.

(51) Int. Cl.
*H02M 1/15* (2006.01)
*H02M 5/458* (2006.01)
*H02J 3/38* (2006.01)
*H02M 1/12* (2006.01)
*H02M 7/48* (2007.01)
*H02M 1/00* (2006.01)

(52) U.S. Cl.
CPC ............... *H02M 5/458* (2013.01); *H02J 3/38* (2013.01); *H02M 1/12* (2013.01); *H02M 1/15* (2013.01); *H02M 7/48* (2013.01); *H02M 2001/007* (2013.01)

(58) Field of Classification Search
CPC ....................................................... H02M 1/15
See application file for complete search history.

(56) References Cited

U.S. PATENT DOCUMENTS

| | | | | |
|---|---|---|---|---|
| 4,034,263 A | * | 7/1977 | Dietz ....................... | H03K 4/83 315/408 |
| 6,236,192 B1 | * | 5/2001 | Suzuki .................. | H02M 5/225 323/239 |

(Continued)

*Primary Examiner* — Emily P Pham
(74) *Attorney, Agent, or Firm* — Barnes & Thornburg LLP

(57) ABSTRACT

An inverter for converting an input direct current (DC) waveform from a DC source to an output alternating current (AC) waveform for delivery to an AC grid includes an input converter, an output converter, and an active filter, each of which is electrically coupled to a bus. The bus may be a DC bus or an AC bus. The input converter is configured to convert the input DC waveform to a DC or AC bus waveform. The output converter is configured to convert the bus waveform to the output AC waveform at a grid frequency. The active filter is configured to reduce a double-frequency ripple power of the bus waveform by supplying power to and absorbing power from the power bus.

20 Claims, 18 Drawing Sheets

(56) References Cited

U.S. PATENT DOCUMENTS

| | | | | |
|---|---|---|---|---|
| 6,542,390 B2* | 4/2003 | Bixel | ............... | H02M 5/4585 |
| | | | | 363/67 |
| 6,771,521 B1* | 8/2004 | Xiong | ................. | H02M 1/34 |
| | | | | 363/21.06 |
| 7,372,709 B2* | 5/2008 | Mazumder | ............. | H02J 3/387 |
| | | | | 363/132 |
| 8,264,857 B2* | 9/2012 | Mallwitz | ........... | H02M 3/33576 |
| | | | | 363/126 |
| 8,466,658 B2* | 6/2013 | Kajouke | .......... | H02M 3/33584 |
| | | | | 320/128 |
| 2008/0013351 A1* | 1/2008 | Alexander | ......... | H02M 3/1582 |
| | | | | 363/123 |
| 2008/0205109 A1* | 8/2008 | Darroman | ............... | B60L 7/16 |
| | | | | 363/132 |
| 2009/0251938 A1* | 10/2009 | Hallak | ............... | H02M 7/4807 |
| | | | | 363/132 |

* cited by examiner

APPARATUS FOR CONVERTING DIRECT CURRENT TO ALTERNATING CURRENT USING MULTIPLE CONVERTERS

CROSS-REFERENCE TO RELATED U.S. PATENT APPLICATION

This application is a continuation application of U.S. application Ser. No. 13/633,518, now U.S. Pat. No. 9,093,919, entitled "Apparatus for Converting Direct Current to Alternating Current," which was filed on Oct. 2, 2012 and is a continuation application of U.S. application Ser. No. 12/563,499, now U.S. Pat. No. 8,279,642, entitled "Apparatus for Converting Direct Current to Alternating Current using an Active Filter to Reduce Double-Frequency Ripple Power of Bus Waveform," which was filed on Sep. 21, 2009 and which claims priority under 35 U.S.C. §119(e) to U.S. Provisional Patent Application Ser. No. 61/230,546 entitled "Apparatus for Converting Direct Current to Alternating Current," by Robert S. Balog, Jr. et al., which was filed on Jul. 31, 2009, the entirety of both of which is hereby incorporated by reference.

Cross-reference is made to U.S. Utility patent application Ser. No. 12/563,499 entitled "Apparatus for Converting Direct Current to Alternating Current" by Patrick P. Chapman et al., which was filed on Sep. 21, 2009, and to U.S. Utility patent application Ser. No. 11/871,015 entitled "Methods for Minimizing Double-Frequency Ripple Power in Single-Phase Power Conditioners" by Philip T. Krein. et al., which was filed on Oct. 11, 2007, the entirety of both of which is incorporated herein by reference.

TECHNICAL FIELD

The present disclosure relates, generally, to power converters for converting direct current (DC) power to alternating current (AC) power and, more particularly, to apparatuses and methods for converting DC power to AC power suitable for supplying energy to a an AC grid or AC load coupled to the AC grid.

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

A basic electrical property of a single-phase AC power system is that the energy flow includes both an average power portion that delivers useful energy from the energy source to the load and a double-frequency portion that flows back and forth between the load and the source:

$$p(t) = Po + Po^* \cos(2\omega t + \phi) \qquad \text{Equation 1}$$

In applications involving inverters, the double-frequency portion represents undesirable ripple power that, if reflected back into the DC power source in a significant amount, may compromise performance of the source. Such concerns are particularly relevant to photovoltaic cells wherein the power delivered by each photovoltaic cell may vary in magnitude over time due to temporal variations in operating conditions including changes in sunlight intensity, angle of incidence of sunlight, ambient temperature and other factors. As such, photovoltaic cells have an operating point at which the values of the current and voltage of the cell result in an ideal or "maximum" power output. This "maximum power point" ("MPP") is a function of environmental variables, including light intensity and temperature. Inverters for photovoltaic systems may include some form of maximum power point tracking ("MPPT") as a mechanism of identifying and tracking the maximum power point ("MPP") and adjusting the inverter to exploit the full power capacity of the cell at the MPP. Extracting maximum power from a photovoltaic cell requires that the cell operate continuously at its MPP. As such, fluctuations in power demand, caused, for example, by the double-frequency ripple power being reflected back into the cell, may compromise the ability of the inverter to deliver the cell's maximum power.

In typical inverters, the double-frequency ripple power is managed by storing and delivering energy at twice the AC frequency. To do so, a passive or active filter is typically used to manage the double-frequency ripple power on the input side of the inverter. In passive filtering arrangements, a large capacitance is typically required because the capacitive device must support the DC bus voltage without imposing significant voltage ripple on the DC bus. However, in active filter arrangements, a relatively smaller capacitance may be used because the capacitive device need not support the DC bus voltage. Because the active filter "isolates" the internal capacitor from the DC bus, the voltage variation across the internal capacitor can be relatively large and the value of the capacitor may be made relatively small.

In a typical photovoltaic power system, an inverter may be associated with one or more solar cell panel. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

SUMMARY

According to on aspect, an inverter for converting an input direct current (DC) waveform from a DC source to an output alternating current (AC) waveform for delivery to an AC grid may include an input converter, an output converter, an active filter. The input converter may be electrically coupled to a power bus and may include a transformer. The input converter may be configured to convert the input DC waveform to a bus waveform supplied to the power bus. The output converter may be electrically coupled to the power bus and configured to convert the bus waveform to the output AC waveform at a grid frequency. The active filter may be electrically coupled to the power bus. Additionally, the active filter may be configured to reduce a double-frequency ripple power of the bus waveform by supplying power to and absorbing power from the power bus.

In some embodiments, the power bus may be embodied as a DC bus and the bus waveform may be embodied as a first DC waveform. In such embodiments, the input converter may include a first inverter circuit electrically coupled to the DC source and a primary winding of the transformer. The first inverter circuit may be configured to convert the input DC waveform to a first AC waveform at a first frequency.

Additionally, the transformer may be configured to converter the first AC waveform to a second AC waveform at the first frequency. The input converter may also include a rectifier circuit electrically coupled to a secondary winding of the transformer and the power bus. The rectifier circuit may be configured to rectify the second AC waveform to produce the first DC waveform. The input converter may also include an isolated boost converter electrically connected to the DC source and the first inverter circuit.

In some embodiments, the output converter may include a second inverter circuit electrically coupled to the power bus. The second inverter circuit may be configured to convert the first DC waveform to the output AC waveform. The output converter may also include a filter circuit electrically coupled to the second inverter circuit. The filter circuit may be configured to filter the output AC waveform.

In some embodiments, the active filter may include a bridge circuit electrically coupled to an energy storage device. The bridge circuit may be a half-bridge or full-bridge circuit and the energy storage device may be embodied as an inductor-capacitor (LC) circuit. The active filter is may be configured to maintain a substantially constant voltage across the second inverter circuit. In some embodiments, the output AC waveform may include an average component and a time-varying component. In such embodiments, the active filter may be configured to supply substantially all of the time-varying component of the output AC waveform. Additionally, the time-varying component may include a component having a frequency substantially equal to twice the grid frequency.

The active filter may include a third inverter circuit and an energy storage device in some embodiments. The third inverter circuit may be configured to control the time-varying component of the output AC waveform by controlling a time-varying current of the energy storage device. In some embodiments, the third inverter circuit is configured to generate a third AC waveform at the energy storage device. The third AC waveform may have a frequency substantially equal to a harmonic frequency of the grid frequency. Additionally, the third AC waveform may be shifted by $\pi/4$ radians relative to a phase of the output AC waveform. In some embodiments, the third inverter circuit may be embodied as a full bridge circuit.

In some embodiments, the transformer may include a tertiary winding. In such embodiments, the active filter may be connected to the tertiary winding. In such embodiments, the active filter may include a rectifier circuit connected to the tertiary winding, an inverter circuit connected to the rectifier circuit, and an energy storage device. In some embodiments, the power bus may be embodied as a first DC bus. In such embodiments, the inverter further includes a second DC bus electrically coupled to the tertiary winding. In other embodiments, the power bus may be embodied as a first AC bus. In such embodiments, the inverter may further include a second AC bus electrically coupled to the tertiary winding. Additionally, the active filter may be connected to the second AC bus and include an energy storage device connected to a center tap of the tertiary winding.

In embodiments in which the power bus is an AC bus, the input converter may be embodied as a one of a voltage-sourced full bridge converter and a voltage-sourced push-pull converter. Alternatively, the input converter is one of a current-sourced full bridge converter and a current-sourced push-pull converter. In some embodiments, the bus waveform is embodied as a first AC waveform having a first frequency. In such embodiments, the output converter may include a frequency converter circuit configured to convert the second AC waveform to a third AC waveform at the grid frequency.

In some embodiments, the inverter may further include a controller circuit. The controller circuit may be electrically coupled to the input converter and configured to control the input converter to generate the bus waveform based on a maximum power point tracking of the DC source. Additionally or alternatively, the controller circuit may be electrically coupled to the output converter and configured to control the output converter to generate the output AC waveform using pulse width modulation. Additionally or alternatively, the controller circuit may be electrically coupled to the active filter and configured to control the active filter to supply a time-varying waveform to the power bus to reduce the double-frequency ripple power. Additionally, in some embodiments, the DC source may be embodied as one of a photovoltaic cell and a fuel cell.

According to another aspect, an apparatus includes a solar panel and an inverter. The solar panel may include a solar cell configured to generate a first direct current (DC) waveform in response to receiving an amount of sunlight. The inverter may be coupled to the solar cell panel. The inverter may be configured to receive the first DC waveform and convert the first DC waveform to an output alternating current (AC) waveform. In some embodiments, the inverter may include an input converter, and output converter, and an active filter. The input converter may be electrically coupled the solar cell and a DC bus and may be configured to convert the first DC waveform to a second DC waveform supplied to the DC bus. The output converter may be electrically coupled to the DC bus and may be configured to convert the second DC waveform to the output AC waveform at a first frequency. The active filter may be electrically coupled to the DC bus and may be configured to reduce a double-frequency ripple power of the second DC waveform by supplying power to and absorbing power from DC power bus.

In some embodiments, the input converter may include a first inverter circuit and a transformer. The first inverter circuit may be being electrically coupled to the solar cell and a primary winding of the transformer and may be configured to convert the first DC waveform to a first AC waveform at a first frequency. The transformer may be configured to convert the first AC waveform to a second AC waveform at the first frequency. The input converter may further comprise a rectifier circuit electrically coupled to a secondary winding of the transformer and the DC bus. The rectifier circuit may be configured to rectify the second AC waveform to produce the second DC waveform.

The output converter may include a second inverter circuit electrically coupled to the DC bus and configured to convert the second DC waveform to the output AC waveform. The active filter may include an energy storage device and a third inverter circuit configured to generate a third AC waveform at the energy storage device. The third AC waveform may have a frequency substantially equal to a harmonic of the grid frequency. Additionally, in some embodiments, the third AC waveform may be shifted in phase relative to the grid frequency. For example, the AC waveform may be shifted by $\pi/4$ radians relative to a phase of the output AC waveform.

In some embodiments, the inverter may include a controller circuit. The controller circuit may be electrically coupled to the input converter and configured to control the input converter to generate the second DC waveform based on a maximum power point tracking of the solar cell.

Additionally or alternatively, the controller circuit may be electrically coupled to the output converter and configured to control the output converter to generate the output AC waveform using pulse width modulation. Additionally or alternatively, the controller circuit may be electrically coupled to the active filter and configured to control the active filter to supply a time-varying waveform to the DC bus to reduce the double-frequency ripple power.

According to a further aspect, a power inverter may include a direct current (DC) bus, an input converter electrically coupled to the DC bus, an output converter electrically coupled to the DC bus, and an active filter electrically coupled to the DC bus. The input converter may include (i) a transformer having a primary winding and a secondary winding, (ii) a first inverter circuit electrically coupled to the primary winding and configured to convert an input DC waveform to a first alternating current (AC) waveform at the primary winding, the transform being configured to convert the first AC waveform to a second AC waveform, and (iii) a rectifier circuit electrically coupled to the secondary winding and the DC bus. The rectifier circuit may be configured to rectify the second AC waveform to produce a second DC waveform on the DC bus. The output converter may include a second inverter circuit electrically coupled to the DC bus and configured to convert the second DC waveform to an output AC waveform suitable for delivery to an AC grid. The active filter may be configured to reduce double-frequency ripple power of the second DC waveform by supplying power to and absorbing power from DC power bus.

In some embodiments, the active filter may include an energy storage device and a third inverter circuit. The third inverter circuit may be configured to generate a third AC waveform at the energy storage device. The third AC waveform may have a frequency substantially equal to a harmonic of the grid frequency and, in some embodiments, may be shifted by a phase amount (e.g., $\pi/4$ radians) relative to a phase of the output AC waveform. Additionally, in some embodiments, the inverter may further include a controller circuit. The controller circuit may be electrically coupled to the input converter and configured to control the input converter to generate the second DC waveform based on a maximum power point tracking of the solar cell. Additionally or alternatively, the controller circuit may be electrically coupled to the output converter and configured to control the output converter to generate the output AC waveform using pulse width modulation.

DETAILED DESCRIPTION

Figure 1:
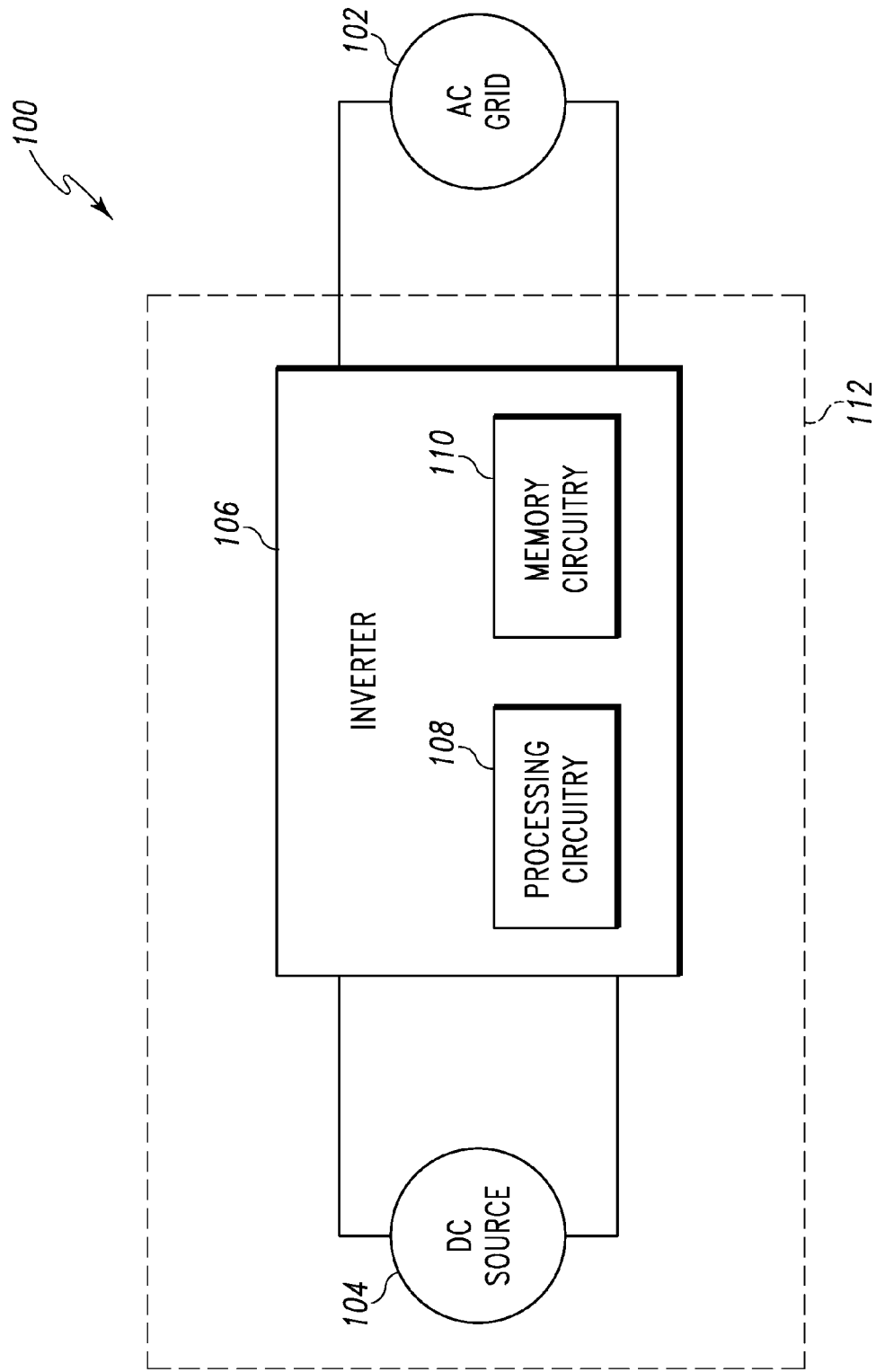
FIG. 1 is a simplified block diagram of one embodiment a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid may be embodied as, for example, a utility power grid that supplies utility AC power to residential and commercial users. Such utility power grids may be characterized as having an essentially sinusoidal bipolar voltage at a fixed grid frequency (e.g., f=ω/2π=50 Hz or 60 Hz).

The inverter 106 includes a plurality of circuits to facilitate the conversion of the DC power to the AC power as discussed in more detail below. In some embodiments, the inverter 106 may include one or more processing circuits 108 and one or more memory circuits 110. The processing circuit 108 may be embodied as any type of processor and associated circuitry configured to perform one or more of the functions described herein. For example, the processing circuit 108 may be embodied as or otherwise include a single or multi-core processor, an application specific integrated circuit, a collection of logic devices, or other circuits. The memory circuits 110 may be embodied as read-only memory devices and/or random access memory devices. For example, the memory circuit 110 may be embodied as or otherwise include dynamic random access memory devices (DRAM), synchronous dynamic random access memory devices (SDRAM), double-data rate dynamic random access memory devices (DDR SDRAM), and/or other volatile or non-volatile memory devices. The memory circuits 108 may have stored therein a plurality of instructions for execution by the processing circuits to control particular functions of the inverter as discussed in more detail below.

Figure 2:
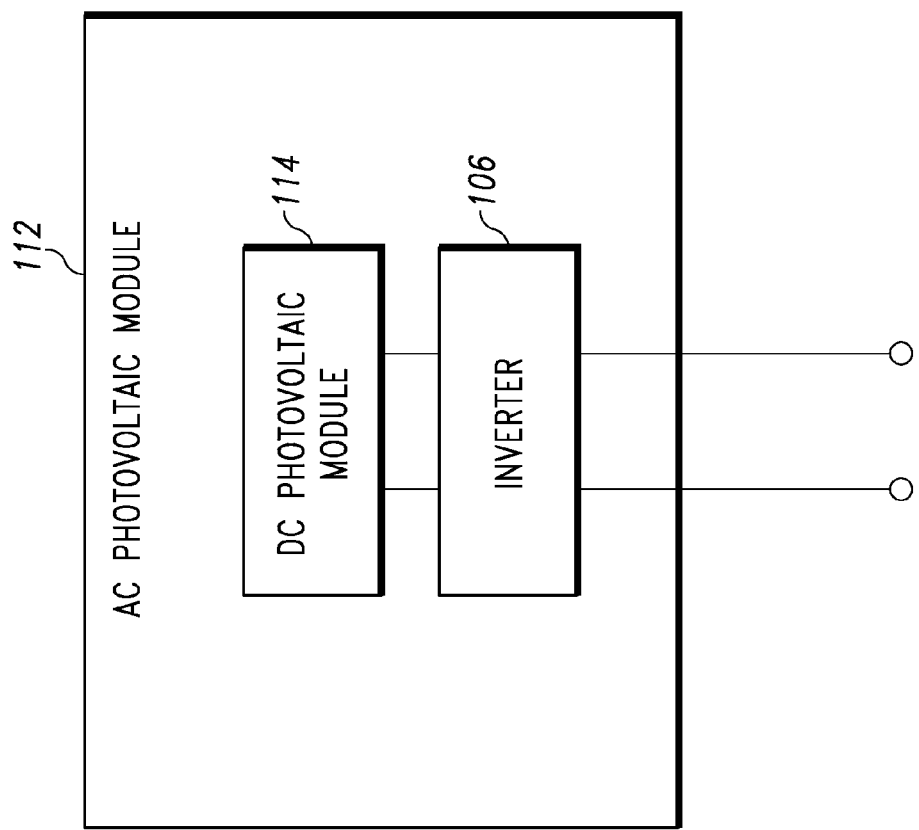
FIG. 2 is a simplified block diagram one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embodied an AC photovoltaic module (ACPV) 112 as illustrated in FIG. 2. The ACPV 112 includes a DC photovoltaic module (DCPV) 114, which operates as the DC source 104, electrically coupled to the inverter 106. The DCPV 114 includes one or more photovoltaic cells and is configured to deliver a DC waveform to the inverter 106 in response to receiving an amount of sunlight. The DC power delivered by the ACPV 112 is a function of environmental variables, such as, e.g., sunlight intensity, sunlight angle of incidence and temperature. In some embodiments, the inverter 106 is positioned in a housing 116 of the ACPV 112. Alternatively, the inverter 106 may include its own housing 118 secured to the housing 116 of the ACPV 112. Additionally, in some embodiments, the inverter 106 is separate from the housing 116, but located near the DCPV 114. As discussed above, the inverter 106 is configured to convert the DC power received from the DCPV 114 to an AC power suitable for delivery to the AC grid 102 at the grid frequency. It should be appreciated that multiple ACPVs 112 may be used to form a solar array with each ACPV 112 having a dedicated inverter 106.

Figure 3:
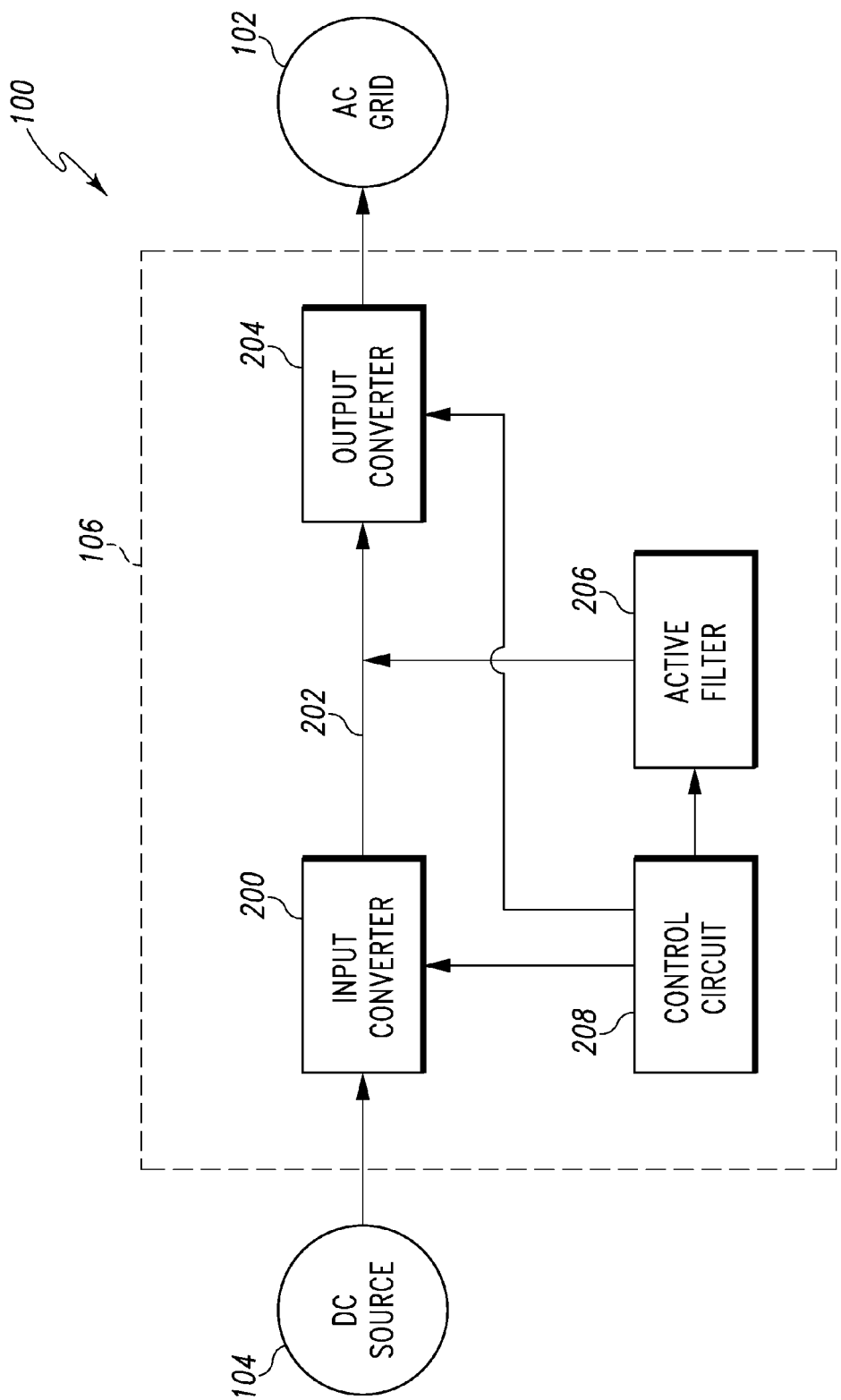
FIG. 3 is a simplified block diagram of one embodiment of an inverter of the system of FIG. 1.

Referring now to FIG. 3, in one embodiment, the inverter 106 includes an input converter 200 electrically coupled to a power bus 202, an output converter 204 electrically coupled to the power bus 202, and an active filter 206 electrically coupled to the power bus 202. Additionally, in some embodiments, the inverter 106 includes a control circuit 208 electrically coupled to the input converter 200, the output converter 204, and the active filter 206 to control operations thereof. As discussed in more detail below, the power bus 202 may be embodied as a DC bus or an AC bus. Accordingly, the input converter 200 may be embodied as a DC-to-DC converter or a DC-to-AC converter and the output converter may be embodied as a DC-to-AC converter or an AC-to-DC converter.

In use, the inverter 106 is configured to be electrically coupled to the DC source 104 to receive a DC waveform therefrom. The inverter 106 converts the DC waveform to a bus waveform, which may be a DC waveform or an AC waveform depending on the type of bus. Similarly, the output converter is configured to be electrically coupled to the AC grid 102 and convert the bus waveform (i.e., either a DC waveform or an AC waveform) to the output AC waveform at the grid frequency for delivery to the AC grid 102.

As discussed above, the single-phase power output of the inverter 106 includes an average component and a time-varying component due to variations in the DC source 102 and/or demands of the AC grid 102. The time-varying component has a frequency substantially equal to twice the output AC waveform (i.e., the grid frequency). Without filtering, such double-frequency power ripple must be supplied by the DC source 102 (i.e., the double frequency ripple power propagates back and forth between the AC grid 102 and the DC source 102). Such demands on the DC source 102 can result in failure or lower performance of the DC source 102 and inverter 106. As such, the active filter 206 is used to reduce or substantially eliminate the double frequency power ripple occurring on the power bus 202 prior to the DC source 102. To do so, the active filter 206 is configured to supply energy to and absorb energy from the power bus 202 to thereby maintain a substantially constant bus voltage and reduce the amount of time-varying component required of the DC source 104.

In typical inverters with passive filtering, the filter is placed on the input side (i.e., on the primary side of the inverter transformer) to filter the double-frequency power ripple on the low voltage bus from the DC source. Passive filters include a capacitive device, such as an electrolytic capacitor, to perform the filtering functions. The amount of energy storable in a capacitor may be defined by:

$$W=0.5*C*V^2 \qquad \text{Equation 2}$$

wherein "W" is the amount of stored energy, "C" is capacitance, and "V" is the voltage.

As such, because the passive filter is coupled to a low voltage bus, a larger capacitance value is required to achieve a desired amount of stored energy. Conversely, the active filter 206 is located on the output side (i.e., on the secondary side of the inverter transformer 304—see FIG. 3) of the inverter 106 and coupled to the higher voltage power bus 202. Because the power bus 202 has a relatively higher voltage than the input side, a smaller value of capacitance may be used to store the same amount of energy. Additionally, because the input bus is a low voltage bus, the change or ripple in the bus is relatively low. As such, the change in energy stored by the passive filter capacitor is relatively low compared to the overall energy storage capability of the passive filter capacitor. Further, the used energy storage of the passive filter cannot be modified because there is no filter control present. Conversely, by controlling the functions of the active filter 206 via the control circuit 208, substantially all of the energy storage capability of the active filter capacitor may be used (e.g., from nearly 0 volts to the power bus 202 rail voltage). As such, because a significantly greater amount of energy storage capability is used in the active filter 206, a capacitor having a smaller capacitance value (and, thereby, a smaller footprint) may be used while still achieving the desired amount of usable energy storage.

As well as reducing the physical size of the capacitor, the lower capacitance requirement allows the use of alternative capacitor technologies, which are typically lower cost and have increased reliability, such as film capacitors. Additionally, placement of the active filter on the output side of the inverter 106 may simplify the transformer 304 of the inverter 106 in some embodiments (e.g., a two-winding transformer may be used). As such, by placing the active filter 206 on the output side of the inverter 106, the operating efficiency of the inverter 106 may be increased because the losses associated with the double-frequency ripple power in the input converter 200 are reduced or substantially eliminated.

As discussed above, the control circuit 208 is electrically coupled to the input converter 200 and configured to control operation of the input converter 200 to convert the input DC waveform from the DC source 104 to a bus waveform at the power bus 202. In one particular embodiment, the control circuit 208 may control the operation of the input converter based on a maximum power point tracking ("MPPT") algorithm or methodology. For example, the control circuit 208 may include an MPPT control circuit configured to execute an MPPT algorithm such as the MPPT algorithm described in U.S. Patent Publication No. 2008/018338, entitled "Ripple Correlation Control Based on Limited Sampling" by Jonathan W. Kimball et al. To do so, the control circuit 208 may provide a plurality of control signals to various circuits of the input converter 200 as described in more detail below.

The control circuit 208 is also electrically coupled to the output converter 204 and configured to control operation of the output converter 204 to convert the bus waveform to the output AC waveform suitable for delivery to the AC grid 102. In one particular embodiment, the control circuit 208 is configured to use a pulse width modulation algorithm to control the output converter 204 such that the output AC waveform is pulse width modulated. To do so, the control circuit 208 may provide a plurality of control signals to various circuits of the output converter 204 as described in more detail below.

Additionally, the control circuit 208 is electrically coupled to the active filter 206 and configured to control the active filter to reduce the double-frequency power ripple on the power bus 202. In some embodiments, the active filter 206 is embodied as a current-controlled switching converter. In such embodiments, the active filter 206 includes an inverter circuit and an energy storage device or circuit. In such embodiments, the control circuit 208 is configured to control the inverter circuit of the active filter 206 to control a time-varying current of the energy storage circuit and generate an active filter AC waveform at the energy storage device to thereby supply energy to or absorb energy from the power bus 202. In some embodiments, the generated active filter AC waveform may have a frequency substantially equal to a harmonic of the grid frequency of the AC grid 102. For example, if the grid frequency is 60 Hz, the active filter AC waveform may have a frequency of 60 Hz, 120 Hz, 180 Hz, etc. Additionally, in some embodiments, the active filter AC waveform may be shifted relative to the AC grid frequency to improve the filtering function. For example, in one particular embodiment, the active filter AC waveform is shifted by $\pi/4$ radians relative to a phase of the output AC waveform as described in more detail in co-pending U.S. patent application Ser. No. 11/871,015 entitled "Methods for Minimizing Double-Frequency Ripple Power in Single-Phase Power Conditioners" by Philip T. Krein. et al.

Figure 4:
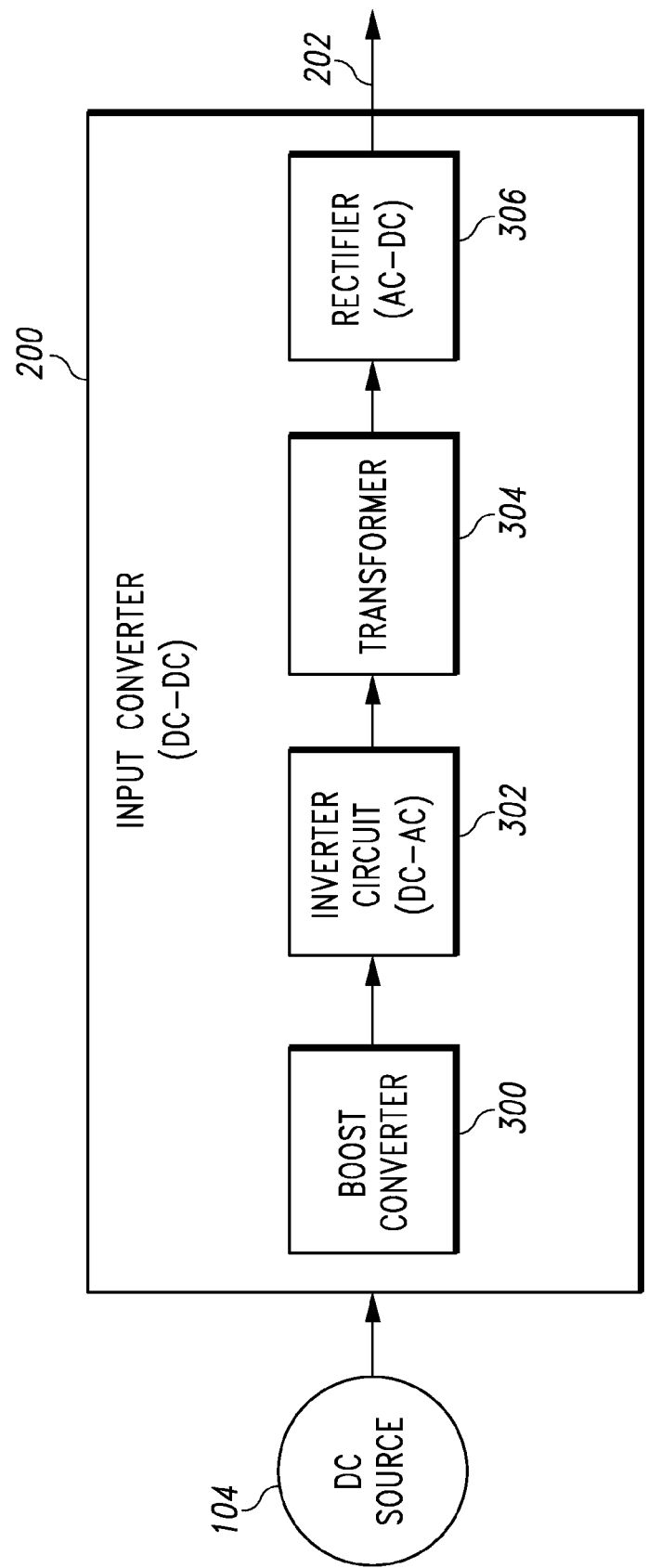
FIG. 4 is a simplified block diagram of one embodiment of an input converter of the inverter of FIG. 3.

Referring now to FIG. 4, in one embodiment the input converter 200 is embodied as a DC-to-DC converter. In such embodiments, the input converter 200 includes a boost converter 300, an inverter circuit 302, a transformer 304, and a rectifier 306. The boost converter 300 is embodied as an isolated boost converter and is electrically coupled to the inverter circuit 302 and configured to be coupled to the DC source 104. The inverter circuit 302 is embodied as a DC-to-AC inverter circuit configured to convert the DC waveform supplied by the DC source 104 to an AC waveform delivered to a primary of the transformer 304. The transformer 304 may be embodied two or more winding transformer having a primary winding electrically coupled to the inverter circuit 302 and a secondary winding coupled to the rectifier 306. The transformer 304 is configured to convert the first AC waveform supplied by the inverter circuit 302 at the primary winding to second AC waveform at the secondary winding. The first and second AC waveforms may have substantially equal frequency and may or may not have substantially equal voltages. The rectifier circuit is electrically coupled to the secondary winding of the transformer 304 and configured to rectify the second AC waveform to a DC waveform supplied to the power bus 202.

Figure 5:
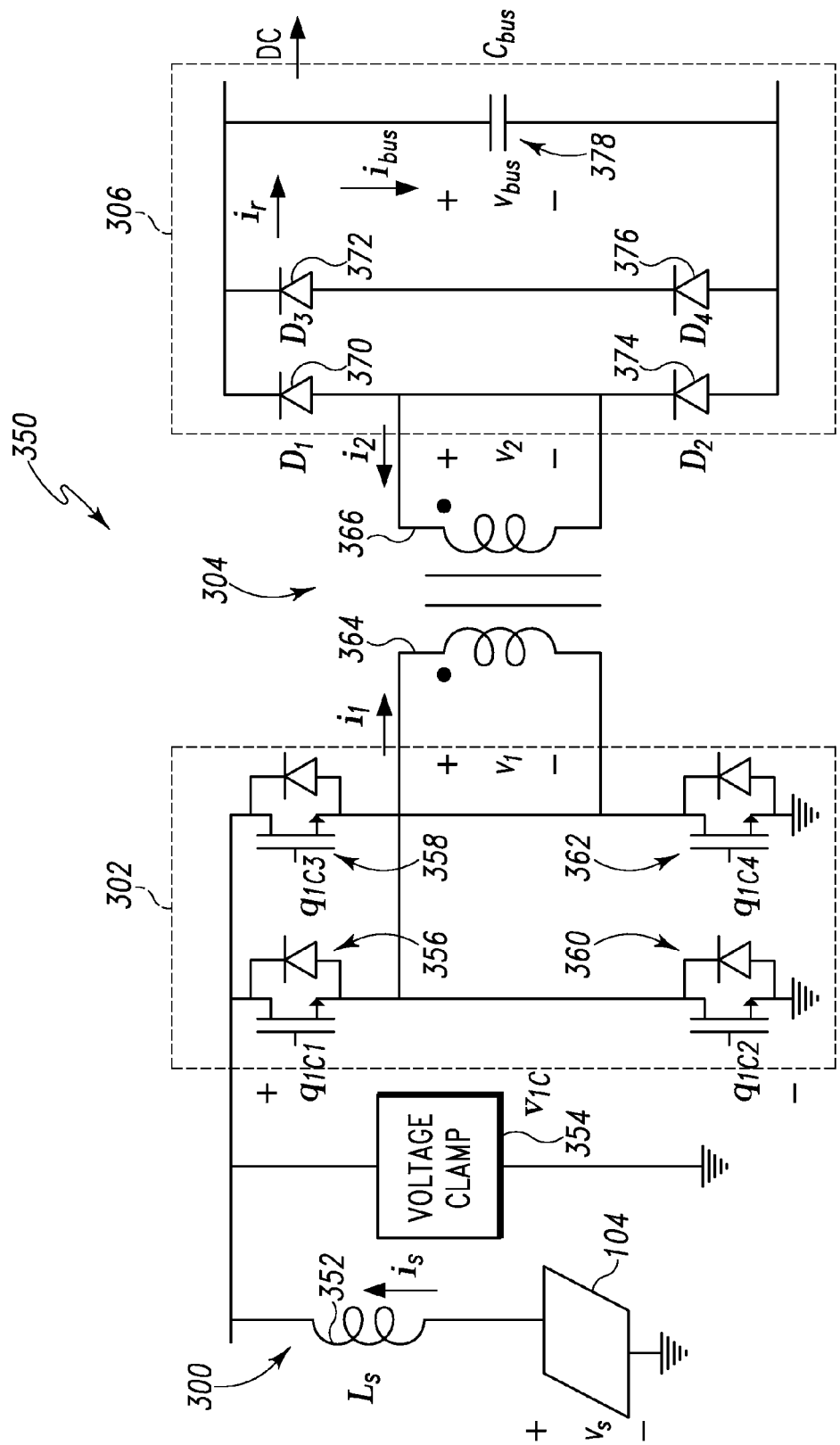
FIG. 5 is a schematic of one embodiment of the input converter of FIG. 4.

One embodiment of a DC-to-DC input converter 350 is illustrated in FIG. 5. The input converter 350 is electrically coupled to the DC source 104, embodied as a photovoltaic cell, via the boost converter 300. In the illustrative embodiment, the boost converter 300 is an isolated boost converter embodied as an inductor 352. The input converter 350 also includes a voltage claim 354 electrically coupled to the inverter circuit 302. The voltage clamp 354 may be embodied as a passive or active circuit. For example, in embodiments wherein the voltage clamp 354 is a passive circuit, a parallel diode and RC circuit may be used. The inverter circuit 302 is illustrative embodied as a bridge circuit formed by a plurality of switches 356, 358, 360, 362. Each of the switches 356, 358, 360, 362 are configured to receive a corresponding control signal, $q_{IC1}$, $q_{IC2}$, $q_{IC3}$, $q_{IC4}$, from the control circuit 208 to control operation of the inverter 302. The control circuit may use PWM to control the switches 356, 358, 360, 362 at a relatively high switching frequency (e.g., at a frequency that is substantially higher than the AC grid frequency). As discussed above, inverter circuit 302 converts the DC waveform from the DC source 104 to a first AC waveform based on the control signals received from the control circuit 208. In the illustrative embodiment, the inverter circuit 302 is a embodied as a full-bridge circuit, but other circuit topologies such as a half-bridge circuit may be used in other embodiments. Additionally, although each of the switches 356, 358, 360, 362 is illustrated as MOSFET devices, other types of switches may be used in other embodiments.

The illustrative transformer 304 includes a primary winding 364 electrically coupled to the inverter circuit 302 and a secondary winding 366 electrically coupled to the rectifier circuit 306. The transformer 304 provides galvanic isolation between the primary side converter circuitry (including DC source 104) and the secondary side circuitry (including power bus 202). The turns ratio of the transformer 304 may also provide voltage and current transformation between the first AC waveform at the primary winding 364 and the second AC waveform at the secondary winding 366.

The rectifier circuit 306 is electrically coupled to the secondary winding 366 of the transformer 304 and configured to convert the second AC waveform supplied by the transformer 304 to a DC bus waveform supplied to the bus 202. In the illustrative embodiment, the rectifier 306 is embodied as a full-bridge rectifier formed from a plurality of diodes 370, 372, 374, 376. Again, in other embodiments, other circuit topologies may be used in the rectifier circuit 306. The rectifier circuit 306 may also include an energy storage device, such as a capacitor 378, for filtering the DC bus waveform.

Figure 6:
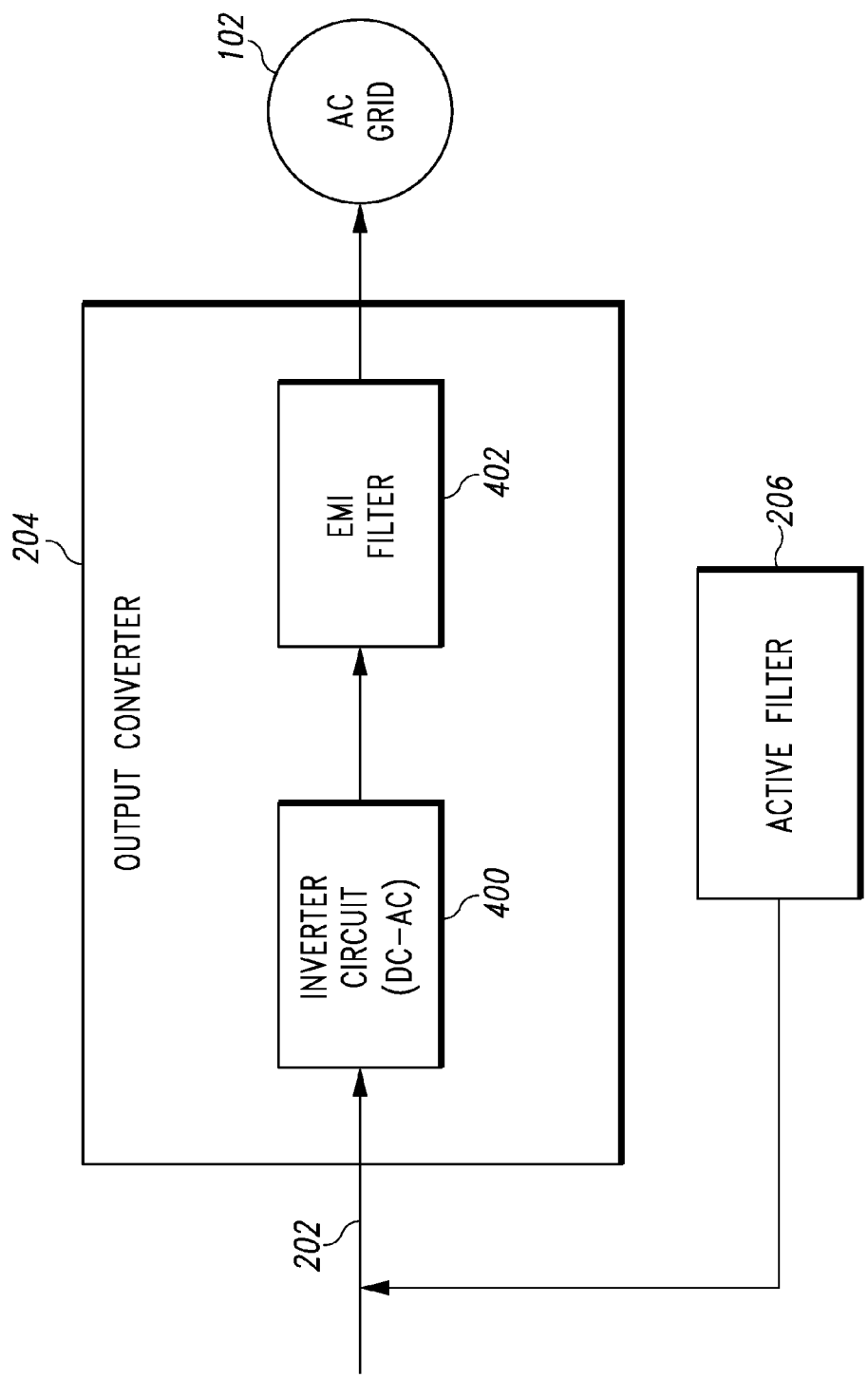
FIG. 6 is a simplified block diagram of one embodiment of the output converter and active filter of the inverter of FIG. 3.

Referring now to FIG. 6, in embodiments wherein the input converter 200 is embodied as a DC-to-DC converter, the output converter 204 may be embodied as a DC-to-AC converter. In such embodiments, the output converter 204 includes an DC-to-AC inverter circuit 400 and an electromagnetic interference (EMI) filter 402. The inverter circuit 400 is electrically coupled to the power bus 202 and configured to convert the DC bus waveform to the output AC waveform, which is filtered by the EMI filter 402. Additionally, the active filter 206 is electrically coupled to the power bus 202 and configured to reduce the double-frequency power ripple of the power bus 202 as described above.

Figure 7:
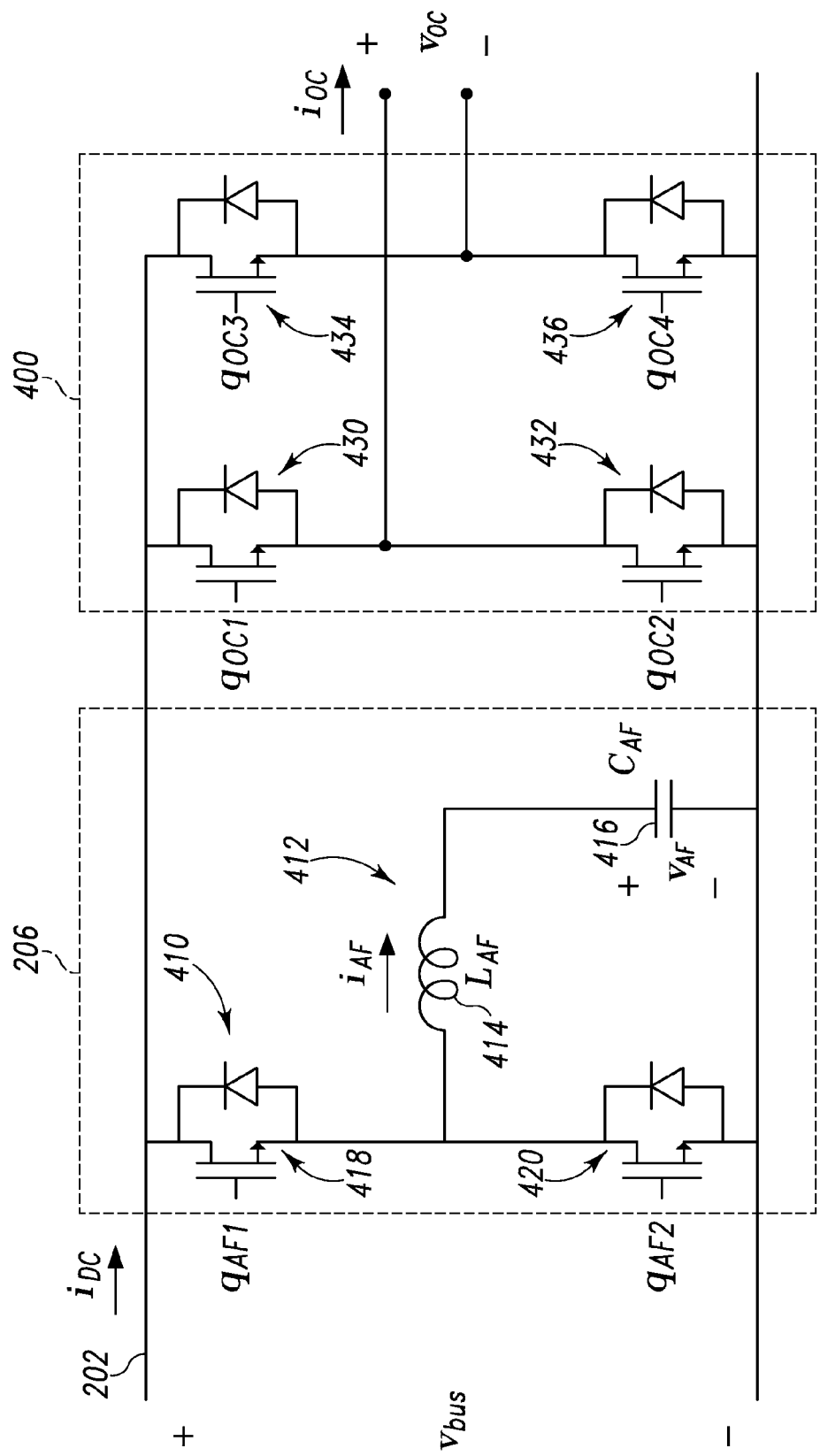
FIG. 7 is a schematic of one embodiment of the output converter and active filter of FIG. 6.
Figure 9:
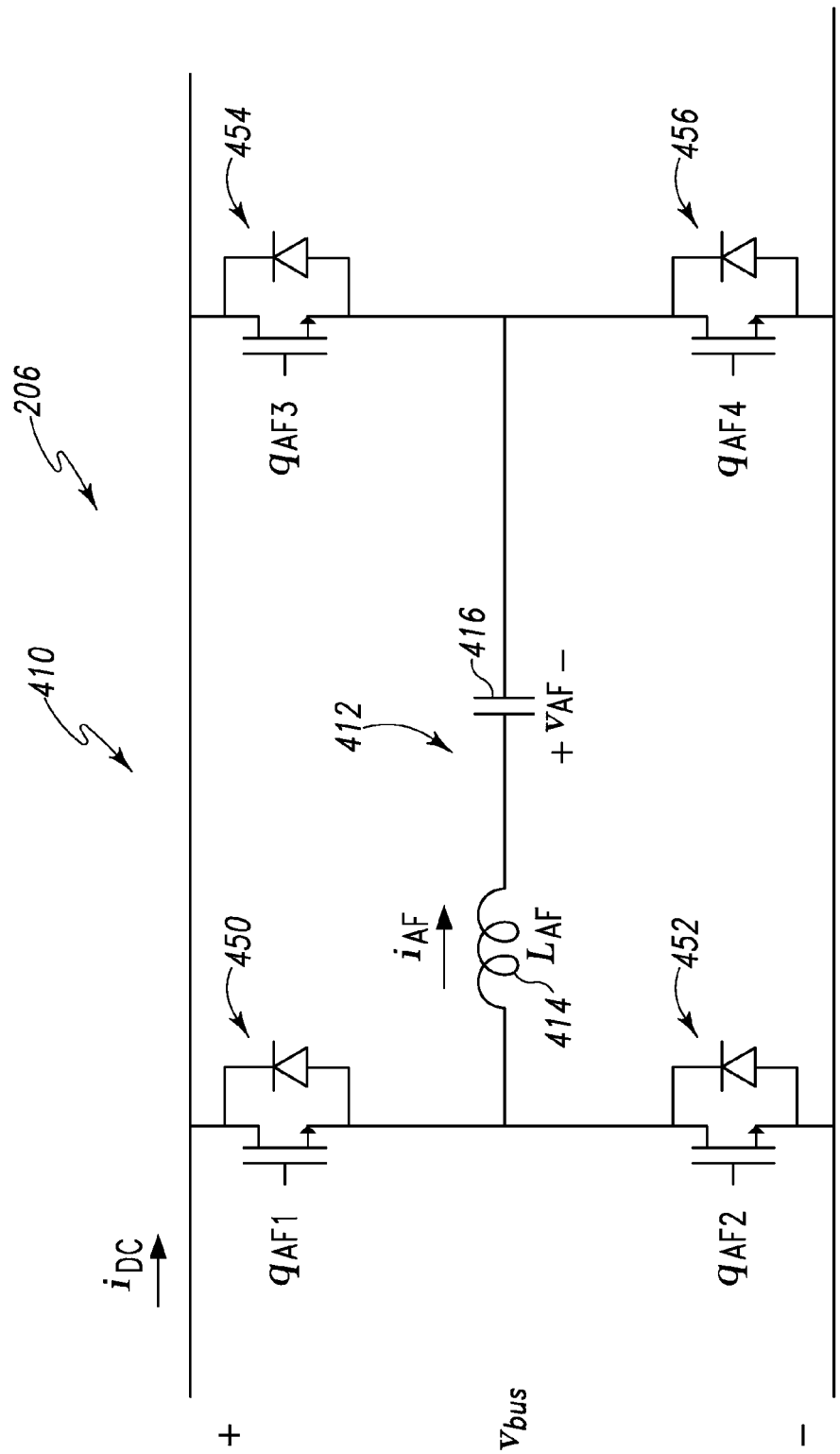
FIG. 9 is a schematic of another embodiment of the active filter of FIG. 6.

One embodiment of the inverter circuit 400 of the output converter 204 and the active filter 206 is illustrated in FIG. 7. The active filter 206 and the inverter circuit 400 are electrically coupled in parallel to the power bus 200. The active filter 206 is embodied as a bridge circuit 410 electrically coupled to an energy storage circuit 412. The energy storage circuit 412 is embodied as a series inductor 414 and capacitor 416 circuit. The bridge circuit 410 is illustrative embodied as a half-bridge circuit formed from a plurality of switches 418, 420. Each of the switches 418, 420 are configured to receive a corresponding control signal, $q_{AF1}$, $q_{AF2}$, from the control circuit 208 to control operation of the active filter 206. As discussed above, the control circuit 208 may be configured to control the bridge circuit 410 to control a time-varying current supplied to the energy storage circuit 412 and generate an active filter AC waveform at the energy storage circuit 412 having a frequency substantially equal to a harmonic the grid frequency of the AC grid 102 to supply energy to and absorb energy from the power bus 202 and thereby reduce the double-frequency power ripple on the bus 202. In the illustrative embodiment, the bridge circuit 420 is embodied as a half-bridge circuit, but other circuit topologies may be used in other embodiments. For example, as illustrated in FIG. 9, bridge circuit 410 may be embodied as a full-bridge circuit in some embodiments. In such embodiments, the bridge circuit 410 is formed from four switches 450, 452, 454, 456, each configured to receive a corresponding control signal, $q_{AF1}$, $q_{AF2}$, $q_{AF3}$, $q_{AF4}$, from the control circuit 208 to control operation of the active filter 206. The energy storage circuit 412 is located between the arms of the full-bridge circuit 410 to form an H-bridge circuit. Additionally, other circuit topologies may be used in other embodiments. Further, although each of the switches 418, 420, 450, 452, 454, 456 is illustrated as MOSFET devices, other types of switches may be used in other embodiments.

As discussed above, the DC-to-AC inverter circuit 400 of the output converter 204 is electrically coupled to the power bus 202 in parallel with the active filter 206. The inverter circuit 400 is configured to convert the DC bus waveform to the output AC waveform for delivery to the AC grid 102. The inverter circuit 400 is illustrative embodied as a bridge circuit formed by a plurality of switches 430, 432, 434, 434. Each of the switches 430, 432, 434, 434 are configured to receive a corresponding control signal, $q_{OC1}$, $q_{OC2}$, $q_{OC3}$, $q_{OC4}$, from the control circuit 208 to control operation of the inverter 400. As discussed above, the control circuit may use PWM to control the switches 430, 432, 434, 434 to generate a pulse width modulated AC waveform. Again, it should be appreciated that although the illustrative the inverter circuit 302 is a embodied as a full-bridge circuit, other circuit topologies such as a half-bridge circuit may be used in other embodiments. Additionally, although each of the switches 430, 432, 434, 434 is illustrated as MOSFET devices, other types of switches may be used in other embodiments.

Figure 8:
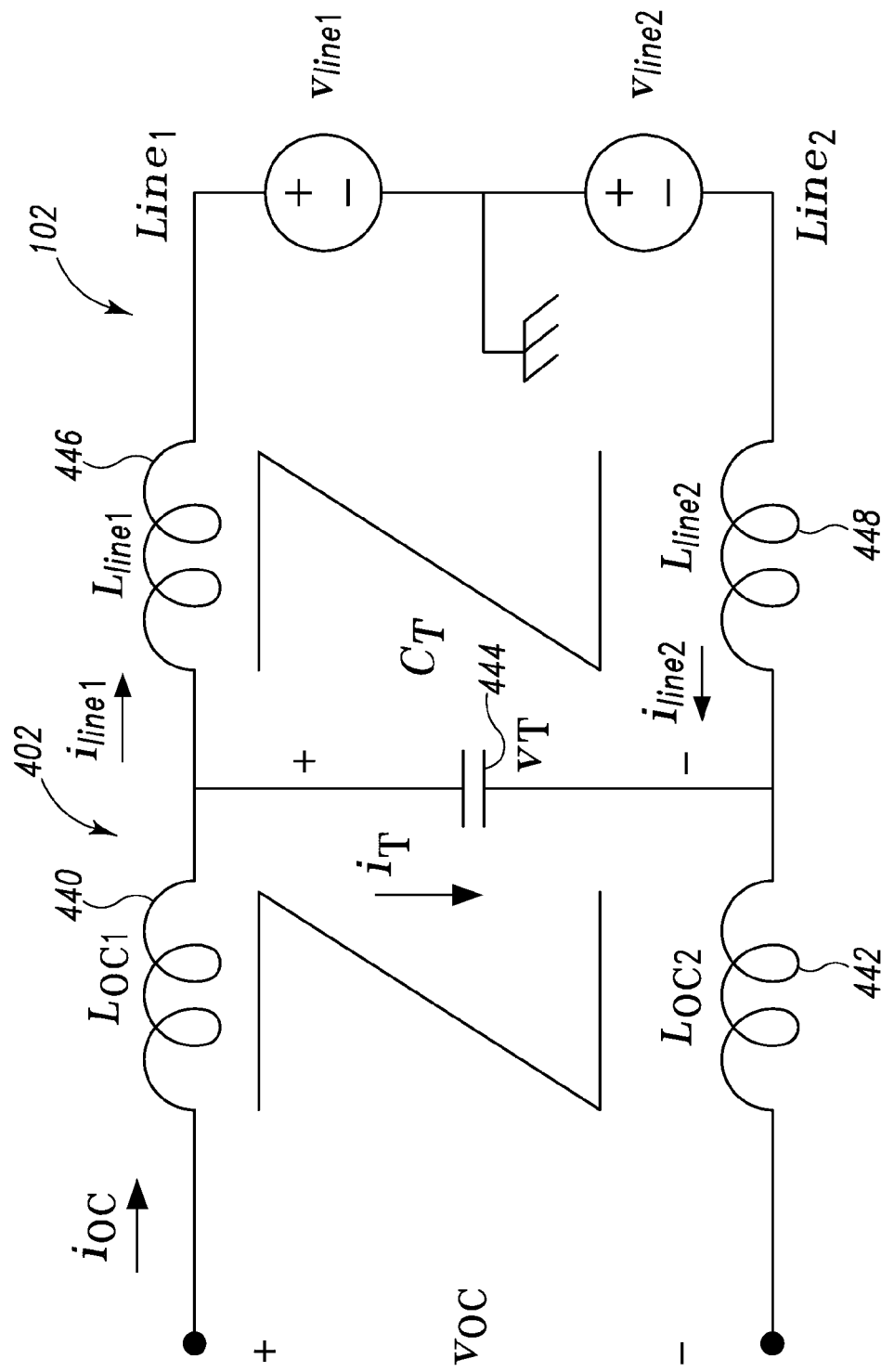
FIG. 8 is a schematic of one embodiment of an EMI filter of the output converter of FIG. 6.

On embodiment of the EMI filter 402 and other filtering circuitry is illustrated in FIG. 8. The EMI filter 402 is configured to filter the output voltage by reducing the conducted interference and satisfying regulatory requirements. In the illustrative embodiment, the filter 402 includes differential-mode inductors 440, 442, a line filter capacitor 444, and common-mode inductors 446, 448.

Figure 10:
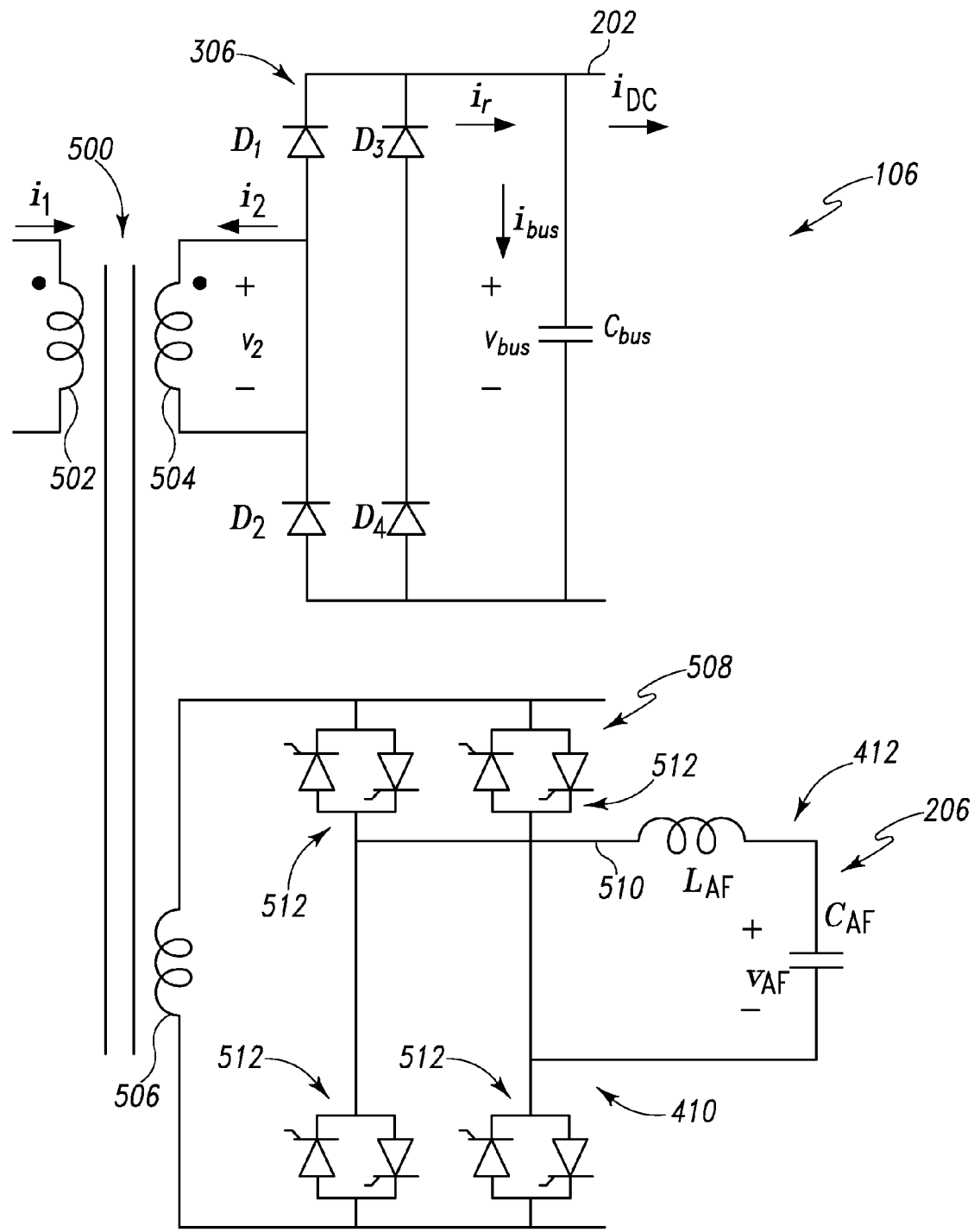
FIG. 10 is a schematic of another embodiment of the active filter of FIG. 6.
Figure 11:
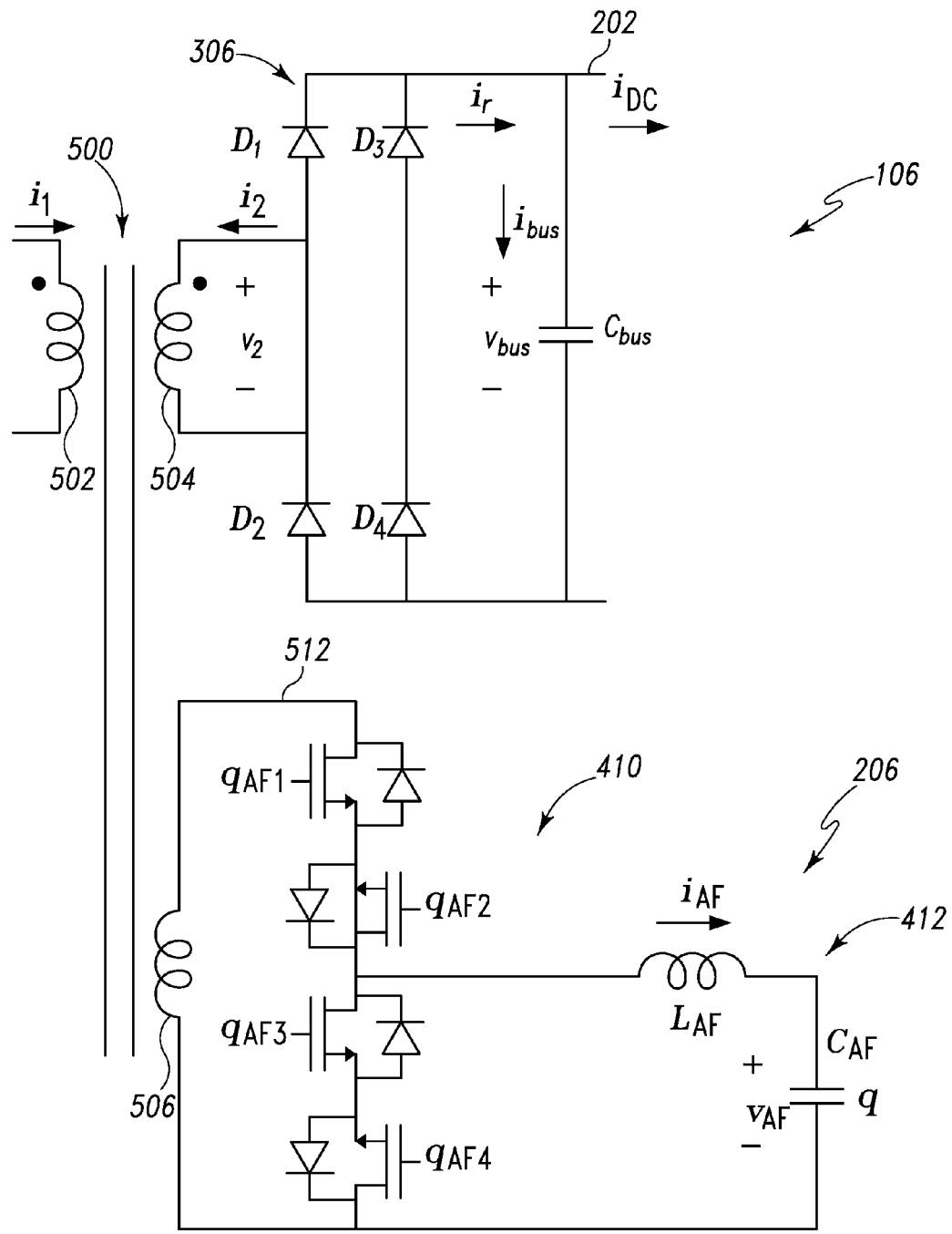
FIG. 11 is a schematic of another embodiment of the active filter of FIG. 6.

Referring now to FIGS. 10 and 11, the transformer 304 of the input converter 200 may be embodied as a transformer 500 having a primary winding 502, a secondary winging 504, and a tertiary winding 506. In such embodiments, the inverter circuit 302 is electrically coupled to the primary winding 502 of the transformer 500 and the rectifying circuit 306 is electrically coupled to the secondary winding 504. In such embodiments, the inverter 106 includes an DC or AC bus in addition to the power bus 202. For example, as illustrated in FIG. 10, the inverter 106 includes a bi-directional rectifier 508, which is embodied as a plurality of silicon rectifier diodes (SCRs), electrically coupled to the tertiary winding 506 and a DC bus 510. The bi-directional rectifier 508 is configured to covert an AC waveform on at the tertiary winding 506 to a DC bus waveform at the DC bus 510. In such embodiments, the bi-directional rectifier 508 also forms the bridge circuit 410 of the active amplifier 206, which controls a time-varying current of the energy storage circuit 412 based on control signals received from the control circuit 208 as discussed above. The active filter 206 is electrically coupled to the DC bus 510 and configured to reduce the double-frequency power ripple of the power bus 202.

Alternatively, as illustrated in FIG. 11, the inverter 106 may include an AC power bus 512 coupled to the tertiary winding 506. In such embodiments, the active filter 206 is electrically coupled to the AC bus 512. However, the bridge circuit 410 is bi-directional and embodied a plurality of switches 520, 522, 524, 526. Illustratively, the switches 520, 522, 524, 526 are embodied as MOSFETs, but other semiconductor switching devices may be used in other embodiments to form the bi-directional bridge circuit 410. The switches are arranged in series pairs (i.e., switches 520, 522 and switches 524, 526) in a drain-source-source-drain series connection. Again, in other embodiments, other types of switches and circuit topology may be used.

Figure 12:
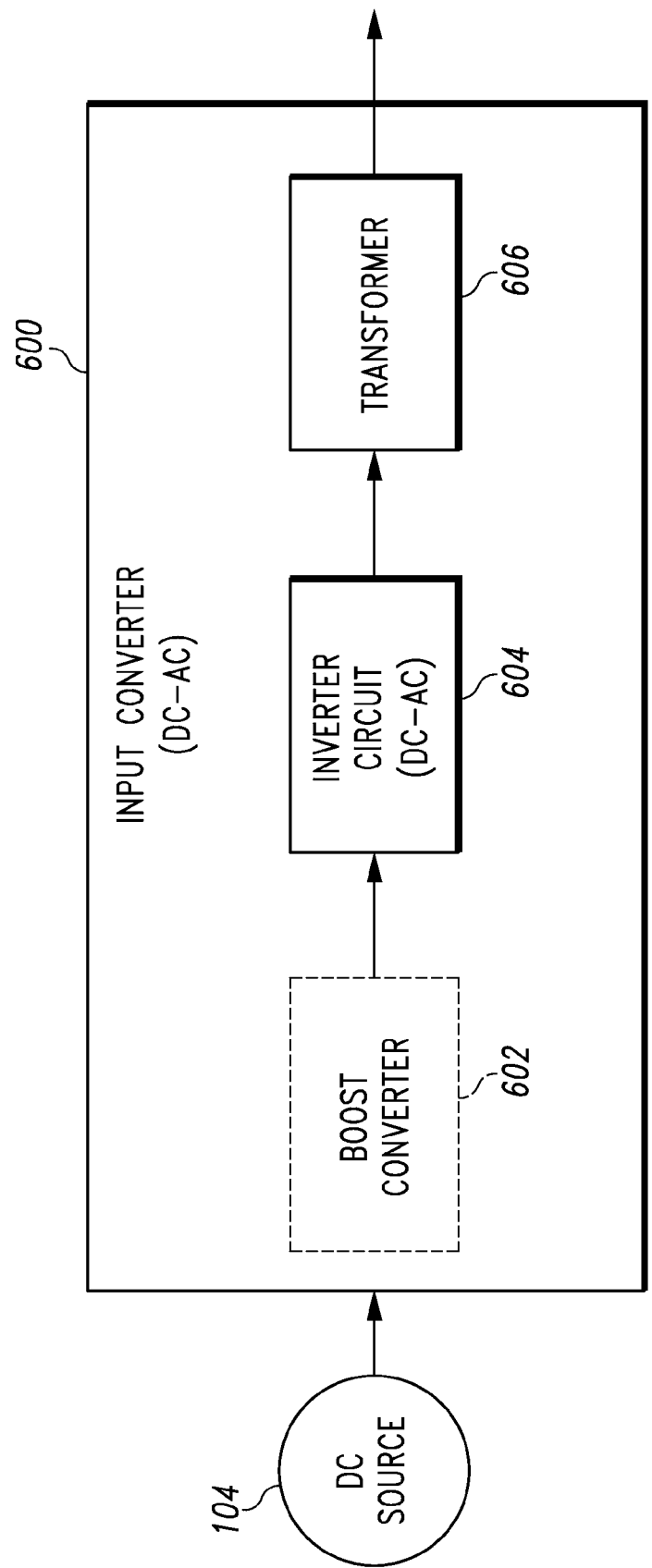
FIG. 12 is a simplified block diagram of another embodiment of the input converter of FIG. 4.

Referring now to FIG. 12, in another embodiment, power bus 202 is embodied as an AC bus and the input converter 200 is embodied as a DC-to-AC inverter 600. In such embodiments, the input converter 600 may include a boost converter 602, an inverter circuit 604, and a transformer 606. The boost converter 602 may be embodied as an isolated boost converter and is electrically coupled to the inverter circuit 604 and configured to be coupled to the DC source 104. The inverter circuit 604 is embodied as a DC-to-AC inverter circuit configured to convert the DC waveform supplied by the DC source 104 to an AC waveform delivered to a primary of the transformer 606. The transformer 606 may be embodied as a two or more winding transformer having a primary winding electrically coupled to the inverter circuit 604 and a secondary winding coupled to bus 202 (an AC bus in the present embodiment). The transformer 606 is configured to convert the first AC waveform supplied by the inverter circuit 604 at the primary winding to a second AC waveform at the secondary winding. The first and second AC waveforms may have substantially equal frequency and may or may not have substantially equal voltages.

Figure 13A:
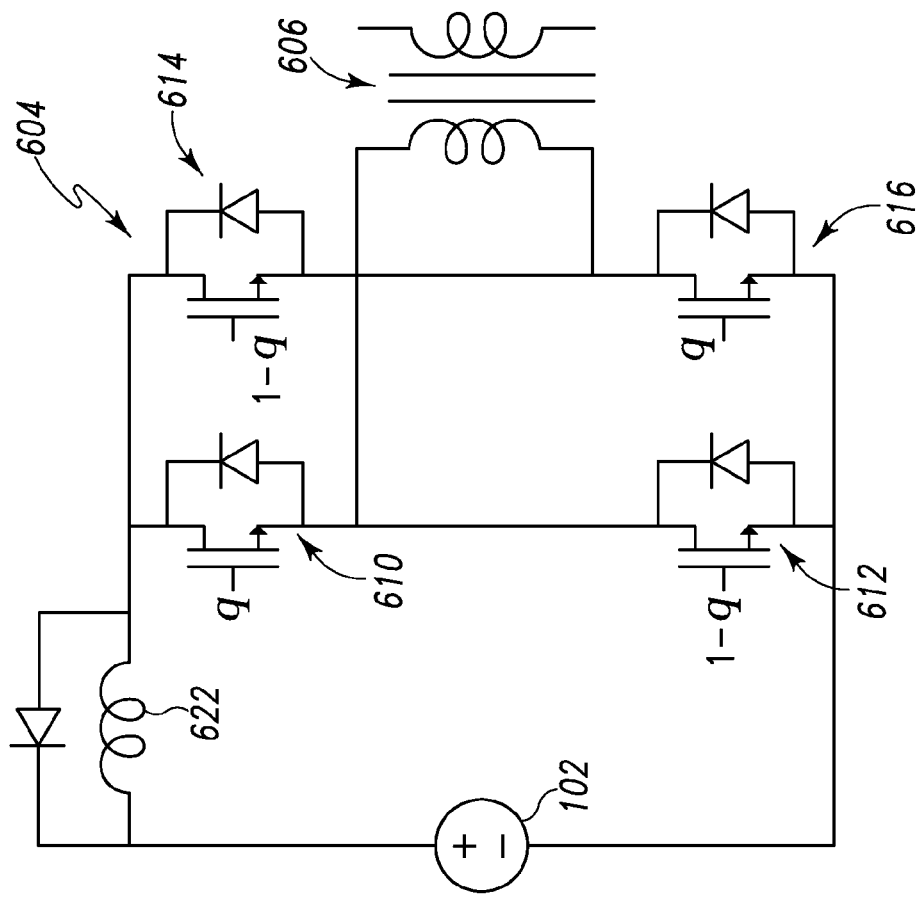
FIGS. 13A-13D are schematics of various embodiments of the input converter of FIG. 12.
Figure 13B:
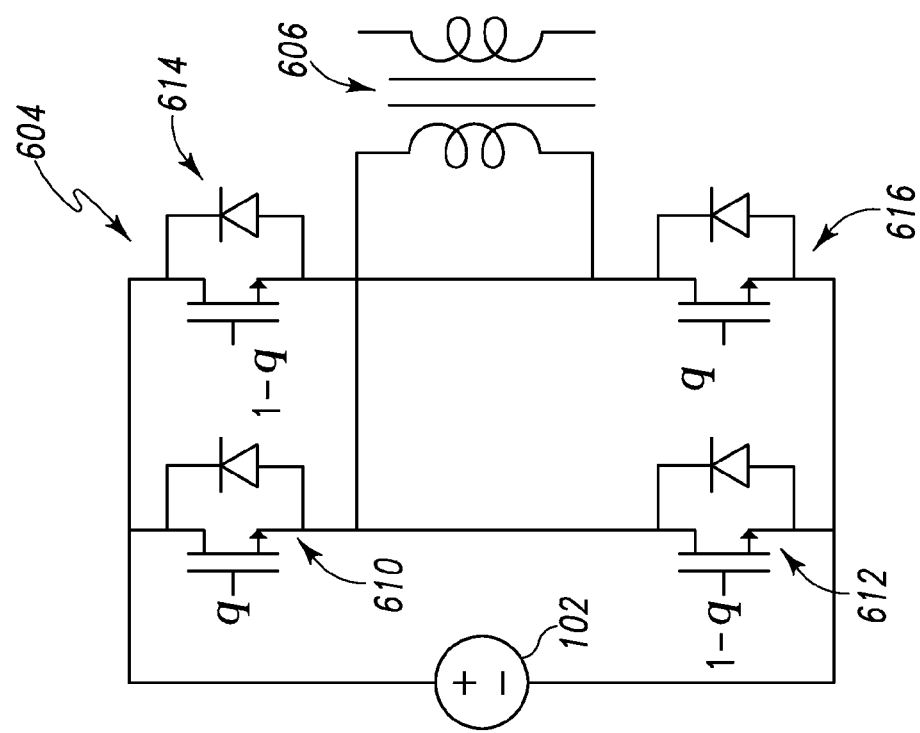
Figure 13D:
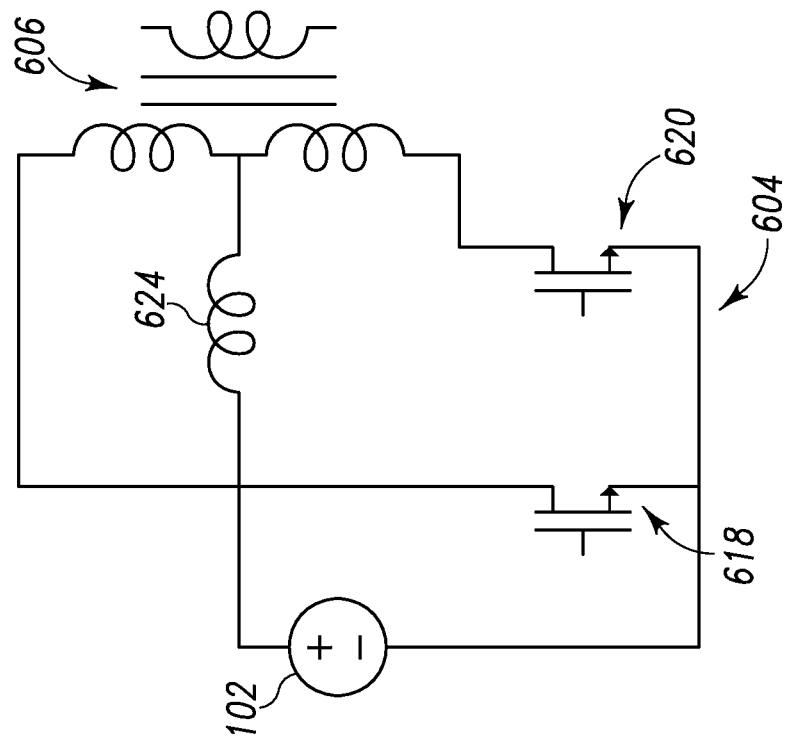
Figure 13C:
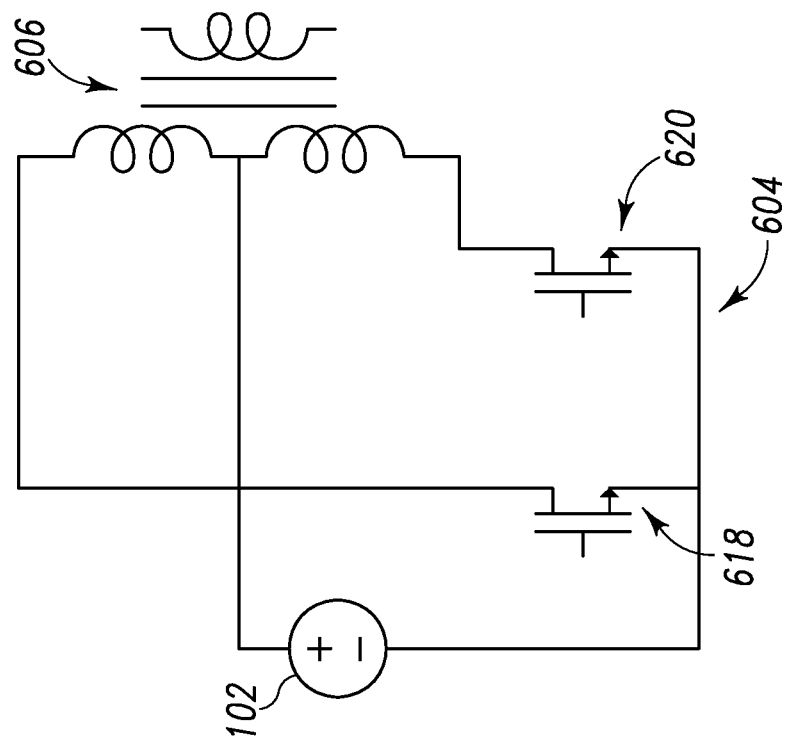

As illustrated in FIG. 13A-13D, the inverter circuit 604 may be embodied as a voltage-sourced full bridge as shown in FIG. 13A, a current-sourced full bridge as shown in FIG. 13B, a voltage-sourced push-pull arrangement as shown in FIG. 13C, or current-sourced push-pull arrangement as shown in FIG. D. The full bridge inverters of FIGS. 13A and 13B are formed from switches 610, 612, 614, 616 and the half-bridge inverters of FIGS. 13C and 13D are formed from switches 618, 620. The switches 610, 612, 614, 616, 618, 620 are illustrative embodied as MOSFET devices, but may be embodied as power semiconductor devices capable of being turned on and off with sufficiently high frequency. Furthermore, each power switch 610, 612, 614, 616, 618, 620 can be driven with a gate-drive circuit. For the push-pull configurations of FIGS. 13C and 13D, the power switches 618, 620 are switched on and off in alternating fashion, each with 50% duty cycle, in one embodiment. For the full-bridge configurations of FIGS. 13A and 13B, pairs of switches (marked q or 1−q) are switched on and off together, where q is either a 0 (off) or 1 (on). In the push-pull configurations of FIGS. 13C and 13D, the transformer 606 includes a tapped primary winding 313.

In regard to the voltage-sourced configurations of FIGS. 13A and 13B, the alternating switching of the power switches 610, 612, 614, 616, 618, 620 produces a square wave voltage across the primary windings of the transformer 606 such that an approximately triangular flux linkage pattern is produced in the core of transformer 606. It should be appreciated that the flux in the magnetic core is approximately the integral of the voltage applied to one of its coils. In the ideal situation, an average flux is zero, which occurs when a circuit is driven perfectly symmetrically, and in the case of the push-pull configurations of FIGS. 13C and 13D, the primary windings of the transformer 606 is tapped substantially in the middle.

In regard to the current-sourced configurations of FIGS. 13B and 13D, a series inductor 622, 624, respectively, is used to provide a substantially constant current to feed the inverter circuit 602. The power switches 610, 612, 614, 616, 618, 620 are alternated just as in the voltage source configurations of FIGS. 13A and 13C to produce a square wave current to the primary winding of the transformer 606.

In the push-pull arrangements of FIGS. 13C and 13D, the inverter circuits 604 include only two active switches 618, 620 coupled to ground such that high-side gate drives are not needed. However, because the corresponding primary windings of the transformer 606 are tapped, the transformer 606 is slightly more complex in these embodiments. Additionally, it should be appreciated that only half of the primary winding is used at any given time. Further, because the power switches 618, 620 are in direct series with the primary winding of the transformer 606, a snubber circuit (not shown) may be used to prevent or otherwise limit overvoltages as the power switches 618, 620 are turned off.

In regard to the full-bridge arrangements of FIGS. 13A and 13B, the transformer winding is not tapped and, as such, can be fully utilized. A snubber circuit may or may not be used in these embodiments. However, additional power switches are required to form the full-bridge and a high-side gate drive is used.

Figure 14:
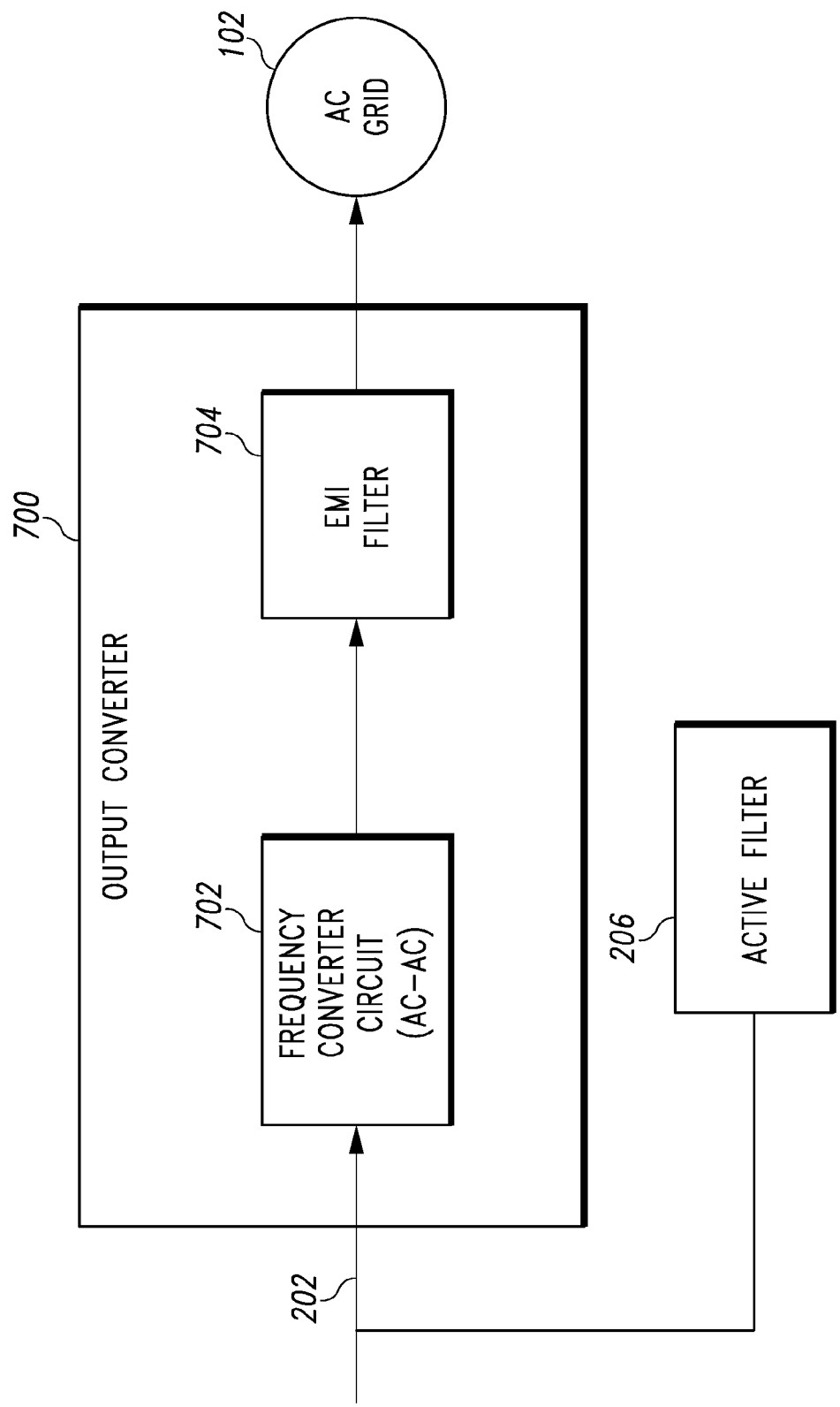
FIG. 14 is a simplified block diagram of another embodiment of the output converter and active filter of FIG. 3.

Referring now to FIG. 14, in embodiments wherein the inverter 106 includes the DC-to-AC input converter 600, the output converter 204 may be embodied as an AC-to-AC output converter 700. In such embodiments, the output converter 700 includes an AC-to-AC frequency converter circuit 702 and an electromagnetic interference (EMI) filter 704. The converter circuit 702 is electrically coupled to the (AC) power bus 202 and configured to convert the AC bus waveform to the output AC waveform, which is filtered by the EMI filter 704. Additionally, the active filter 206 is electrically coupled to the power bus 202 and configured to reduce the double-frequency power ripple of the power bus 202 as described above.

Figure 15A:
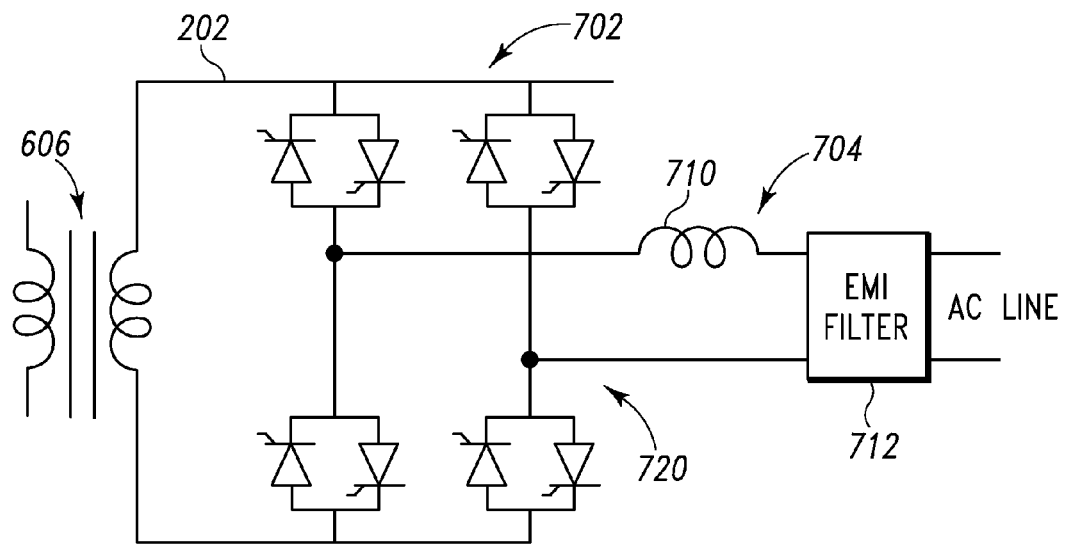
FIGS. 15A-15B are schematics of various embodiments of the output converter of FIG. 14.
Figure 15B:
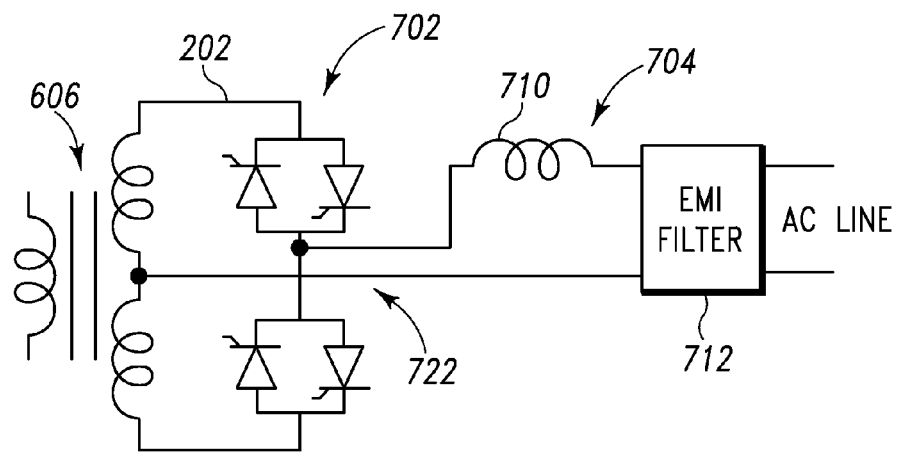
Figure 16:
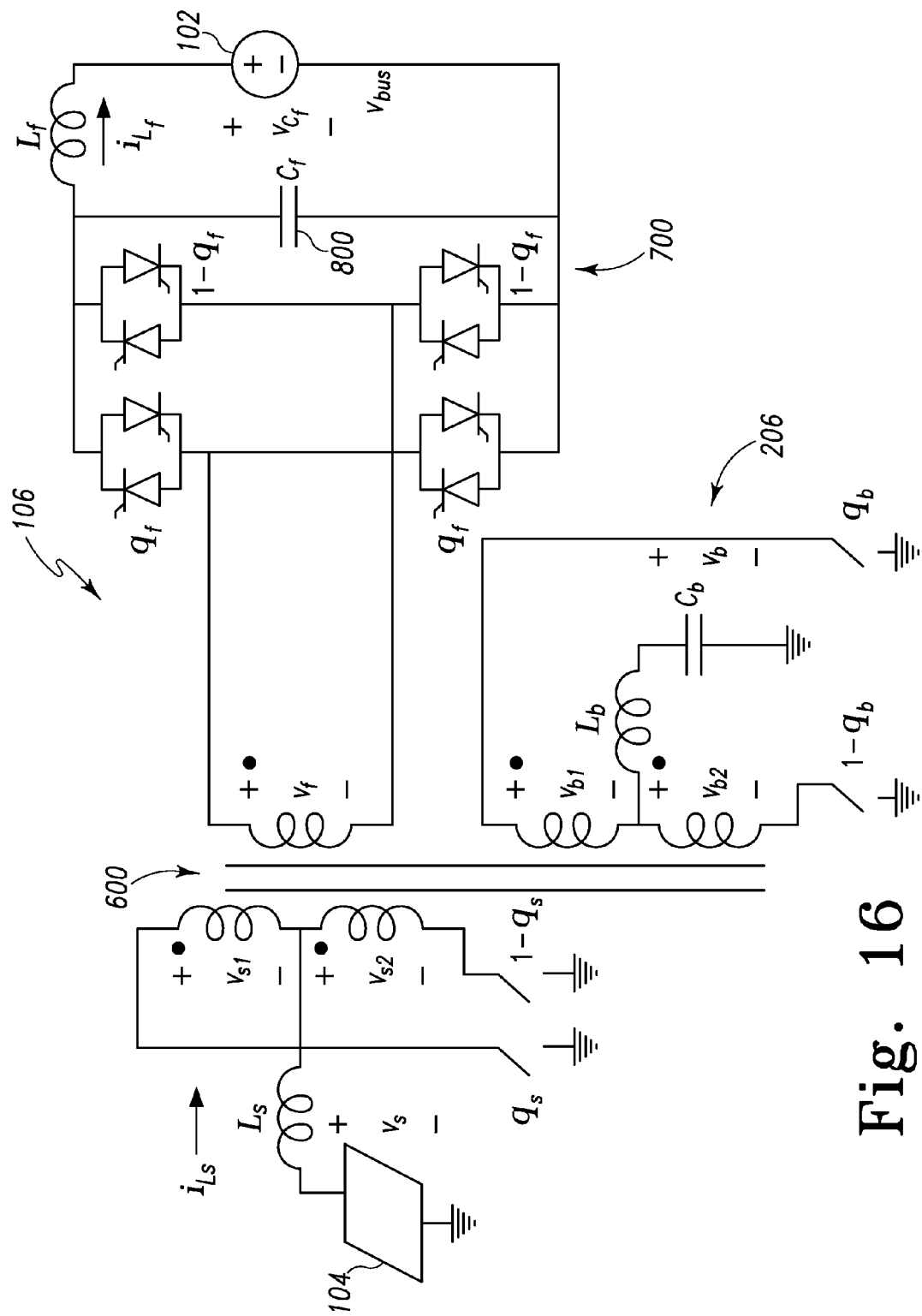
FIG. 16 is a schematic of one embodiment an inverter including the input inverter of FIG. 12 and the output converter and active filter of FIG. 14.

Referring to FIGS. 15A and 15B, two embodiments of the converter circuit 702 are shown. The converter circuit 702 may be embodied as a full-bridge arrangement 720 as illustrated in FIG. 15 A or a half-bridge arrangement 722 as illustrated in FIG. 16. Each embodiment includes an output filter 710 and an electromagnetic interference (EMI) filter 712. The full-bridge or half-bridge arrangements 720, 722 provide modulation of the output voltage of the transformer 606 such that, when passed through the output filter, a substantially smooth sine-wave voltage is produced. The EMI filter 704 eliminates or reduces high-frequency noise from the output converter 702, as required for compliance to standards and overall function of the inverter 106.

As shown in FIG. 15A, the full-bridge configuration 720 includes eight silicon-controlled rectifiers (SCRs). Conversely, as shown in FIG. 15B, the half-bridge configuration 722 includes four SCRs. Additionally, the transformer 606 of the full-bridge configuration 720 includes a single secondary winding. Conversely, the transformer 606 of the half-bridge configuration 722 includes a tapped secondary winding. In should be appreciated that the full-bridge configuration 720, which comprises more SCRs in series, has a simpler magnetic design compared to the half-bridge configuration 722, which has half as many SCRs and is required to block more voltage than the full-bridge configuration 720.

In either configuration, the SCRs are switched such that the output waveform from the secondary winding of the transformer 606 is alternately applied to the output filter 710. The timing of the SCR switching may be based on a suitable PWM algorithm and controlled, for example, by the control circuitry 208. The PWM control produces an output of the inverter 106 that is substantially sinusoidal. It should be appreciated that each of the SCRs may include a gate circuit (not shown) to couple the on/off control signals from the control circuitry 208 to the SCR gate terminals.

The output inductor 710 is used for coupling the AC grid 102 to the inverter 106. The output inductor 710 filters the output current such that limited harmonic distortion occurs in the output AC waveform. Additionally, the EMI filter prevents or minimizes unwanted noise from coupling to the AC grid 102.

Figure 17:
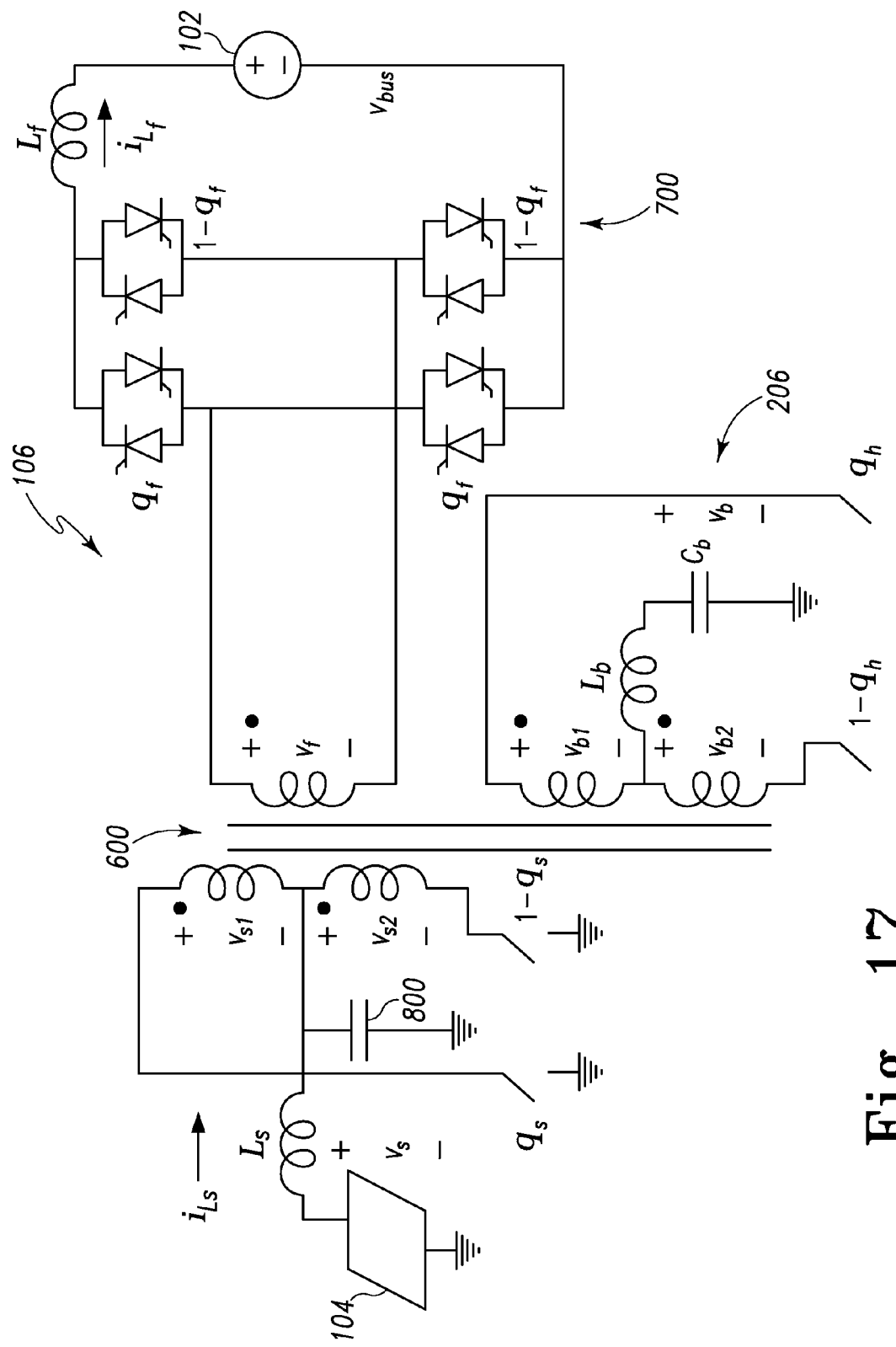
FIG. 17 is a schematic of one embodiment an inverter including the input inverter of FIG. 12 and the output converter and active filter of FIG. 14.

Referring now to FIGS. 16 and 17, two additional illustrative system topologies are illustrated. In FIG. 16, the inverter 106 is embodied as a current-source inverter and includes half-bridges in the input converter 600 and the active filter 206 and a full-bridge in the output converter 700. Similarly, the inverter 106 is embodied as a voltage-source inverter in FIG. 17 and includes half-bridges in the input converter 600 and the active filter 206 and a full-bridge in the output converter 700. It should be appreciated that the circuit topologies of FIGS. 16 and 17 are substantially similar. However, a filtering capacitor 800 is located at the output converter 700 in the current-source inverter of FIG. 16 and located at the input converter 600 in the voltage-source inverter of FIG. 17.

The inverter, controllers, and methods described herein may be implemented as discrete circuits or in the form of software code and/or logical instructions that are processed by a microprocessor, digital processor, DSP or other means, or any combination thereof. The logical processes may run concurrently or sequentially with respect to each other or with respect to other processes, such as measurement processes and related calculations. Controllers may be implemented in mixed-signal circuitry; in circuitry comprising mixed-signal circuitry comprising a digital processor core; or in circuitry comprising a combination of mixed-signal circuitry and a separate digital signal processor. Such controllers may be implemented as an integrated circuit or a hybrid device. There may also be additional logical processes that may not be shown, such as, e.g., safety and protection mechanisms; timing and frequency generation mechanisms; and hardware and processes related to regulatory requirements. Pre-determined values, such as, e.g., the commanded values may be stored in read-only or re-programmable non-volatile memory such as memory circuitry 110 or other storage media. Communication circuitry may also be incorporated into the inverter as a means of downloading commanded values or other operating information to the inverter and/or for uploading inverter operating information to user equipment.

Certain embodiments of the present disclosure have been described. Nevertheless, it will be understood that various modifications may be made without departing from the spirit and scope of the disclosure. For example, any of a wide variety of known non-resonant and resonant switching power converter topologies may be used in place of the specific converter embodiments described herein. The unipolar input source may be a fuel cell or another kind of DC source. The inverter controller may comprise elements for regulatory and safety monitoring and control (e.g., circuits or processes for disabling the inverter in the event of AC grid fault or input source fault; anti-islanding protection). Switches in power converters (e.g., switches 171-174, FIG. 2) are shown to be MOSFETs and to comprise diodes across their terminals. It is understood that other types of switches may be used (e.g., bipolar transistors, IGBTs) and that diodes may be intrinsic to the semiconductor switch or may be discrete devices. Switches may also be provided with passive or active snubbers to prevent losses and/or to limit voltage or current stresses.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting an input direct current (DC) waveform from a DC source to an output alternating current (AC) waveform for delivery to an AC grid, the inverter comprising:
   a first converter having an input to receive the input DC waveform and configured to convert the input DC waveform to a first AC waveform at an output;
   a second converter comprising a bi-directional bridge circuit that includes a plurality of metal-oxide-semiconductor field effect transistors (MOSFETs) and an energy storage device, wherein at least one pair of the plurality of MOSFETs includes a first MOSFET electrically coupled in series with a second MOSFET and having a source terminal electrically coupled to a source terminal of the second MOSFET; and
   a transformer comprising a first winding electrically coupled to the output of the first converter to receive the first AC waveform and another winding electrically coupled to the bi-directional bridge circuit of the second converter,
   wherein the transformer is configured to convert the first AC waveform to a second AC waveform and wherein the second converter is configured to supplement power of the second AC waveform by supplying power to and extracting power from the energy storage device.

2. The inverter of claim 1, wherein the at least one pair of the plurality of MOSFETs includes a first pair of MOSFETs electrically coupled to a second pair of MOSFETs.

3. The inverter of claim 2, wherein a drain terminal of a MOSFET of the first pair is electrically coupled to a drain terminal of a MOSFET of the second pair.

4. The inverter of claim 1, wherein each pair of the plurality of MOSFETs includes a first MOSFET having a source terminal electrically coupled to a source terminal of a second MOSFET.

5. The inverter of claim 1, wherein the plurality of MOSFETs comprises four pairs of MOSFETs.

6. The inverter of claim 1, wherein the plurality of MOSFETs consists of two pairs of MOSFETs.

7. The inverter of claim 1, wherein the second converter comprises a bi-directional frequency converter.

8. The inverter of claim 1, further comprising a resonant converter, wherein the resonant converter includes at least one winding of the transformer.

9. An inverter for converting an input direct current (DC) waveform from a DC source to an output alternating current (AC) waveform for delivery to an AC grid, the inverter comprising:
   a first converter having an input to receive the input DC waveform and configured to convert the input DC waveform to a first AC waveform at an output;
   a second converter comprising a bi-directional bridge circuit that includes a plurality of silicon rectifier diodes (SCRs) and an energy storage device, wherein at least one pair of the plurality of SCRs includes a first SCR electrically coupled in parallel with a second SCR; and
   a transformer comprising a first winding coupled to the output of the first converter to receive the first AC waveform and another winding electrically coupled to the bi-directional bridge circuit of the second converter;
   wherein the transformer is configured to convert the first AC waveform to a second AC waveform at the another winding waveform and wherein the second converter is configured to supplement power of the second AC waveform by supplying power to and extracting power from the energy storage device.

10. The inverter of claim 9, wherein each pair of the plurality of SCRs includes a first SCR electrically coupled in parallel with a second SCR.

11. The inverter of claim 9, wherein the plurality of SCRs comprises four pairs of SCRs.

12. The inverter of claim 9, wherein the plurality of SCRs consists of two pairs of SCRs.

13. The inverter of claim 9, wherein the output converter comprises a bi-directional frequency converter.

14. The inverter of claim 9, further comprising a resonant converter, wherein the resonant converter includes at least one winding of the transformer.

15. An inverter for converting an input direct current (DC) waveform from a DC source to an output alternating current (AC) waveform for delivery to an AC grid, the inverter comprising:

an input converter having an input to receive the input DC waveform and configured to convert the input DC waveform to a first AC waveform at an output;

a transformer comprising a first winding electrically coupled to the output of the input converter to receive the first AC waveform and another winding electrically coupled to an AC power bus, wherein the transformer is configured to convert the first AC waveform to a second AC waveform supplied to the AC power bus; and a frequency converter comprising a plurality of metal-oxide-semiconductor field effect transistors (MOSFETs), an input electrically coupled to the AC power bus to receive the second AC waveform, and an energy storage device, wherein at least one pair of the plurality of MOSFETs includes a first MOSFET electrically coupled in series with a second MOSFET and having a source terminal electrically coupled to a source terminal of the second MOSFET, and wherein the frequency converter is configured to (i) convert the second AC waveform to a third waveform different from the second AC waveform and (ii) supplement power of the third waveform by supplying power to and extracting power from the energy storage device.

16. The inverter of claim 15, wherein the at least one pair of the plurality of MOSFETs includes a first pair of MOSFETs electrically coupled to a second pair of MOSFETs.

17. The inverter of claim 16, wherein a drain terminal of a MOSFET of the first pair is electrically coupled to a drain terminal of a MOSFET of the second pair.

18. The inverter of claim 15, wherein each pair of the plurality of MOSFETs includes a first MOSFET having a source terminal electrically coupled to a source terminal of a second MOSFET.

19. The inverter of claim 15, wherein the plurality of MOSFETs comprises a full-bridge switching circuit.

20. The inverter of claim 15, wherein the plurality of MOSFETs comprises a half-bridge switching circuit.

* * * * *